United States Patent
Fujimoto et al.

(10) Patent No.: US 11,898,783 B2
(45) Date of Patent: Feb. 13, 2024

(54) PERFORMANCE DEGRADATION DIAGNOSIS SYSTEM FOR REFRIGERATION CYCLE APPARATUS

(71) Applicant: DAIKIN INDUSTRIES, LTD., Osaka (JP)

(72) Inventors: Shuji Fujimoto, Osaka (JP); Akihiro Inao, Osaka (JP); Shizuka Sadai, Osaka (JP); Shinichi Kasahara, Osaka (JP); Takeshi Hikawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 209 days.

(21) Appl. No.: 17/598,060

(22) PCT Filed: Mar. 30, 2020

(86) PCT No.: PCT/JP2020/014576
§ 371 (c)(1),
(2) Date: Sep. 24, 2021

(87) PCT Pub. No.: WO2020/203977
PCT Pub. Date: Oct. 8, 2020

(65) Prior Publication Data
US 2022/0170679 A1    Jun. 2, 2022

(30) Foreign Application Priority Data
Mar. 29, 2019    (JP) .................. 2019-069315

(51) Int. Cl.
*F25B 49/02*    (2006.01)
*F25B 41/31*    (2021.01)
(Continued)

(52) U.S. Cl.
CPC ........... *F25B 49/022* (2013.01); *F24F 11/32* (2018.01); *F24F 11/38* (2018.01); *F24F 11/39* (2018.01);
(Continued)

(58) Field of Classification Search
CPC .............. F25B 49/022; F25B 2500/222; F25B 2600/025; F25B 2600/11;
(Continued)

(56) References Cited

U.S. PATENT DOCUMENTS 6,553,774 B1 *  4/2003  Ishio .................... F25B 49/005
                                                    62/126
2007/0204635 A1    9/2007  Tanaka et al.

FOREIGN PATENT DOCUMENTS

EP    2 003 410 A9    12/2008
EP    2 017 556 A1    1/2009
(Continued)

OTHER PUBLICATIONS

International Search Report of corresponding PCT Application No. PCT/JP2020/014576 dated Jun. 30, 2020.
(Continued)

*Primary Examiner* — Jonathan Bradford
(74) *Attorney, Agent, or Firm* — Global IP Counselors, LLP

(57) ABSTRACT

A performance degradation diagnosis system includes a determining unit, and control unit. A refrigeration cycle apparatus includes a refrigerant circuit having a compressor, heat-source-side heat exchanger, and use-side heat exchanger. The determining unit determines, based on an index indicating an operation state of the refrigeration cycle apparatus, performance degradation of the refrigeration cycle apparatus with respect to each of a plurality of performance degradation factors. In a case in which the determining unit determines performance degradation, the control unit grasps an operation condition of the refrigeration cycle apparatus which is operating. In a case in which the operation condition of the refrigeration cycle apparatus is not suitable to determine performance degradation with respect to a performance degradation factor of a determina-
(Continued)

tion target, the control unit controls the operation condition of the refrigeration cycle apparatus so that the operation condition of the refrigeration cycle apparatus becomes an appropriate operation condition.

17 Claims, 7 Drawing Sheets

(51) Int. Cl.
    *F25B 40/02*     (2006.01)
    *F24F 11/32*     (2018.01)
    *F24F 11/38*     (2018.01)
    *F24F 11/39*     (2018.01)

(52) U.S. Cl.
    CPC .............. *F25B 40/02* (2013.01); *F25B 41/31* (2021.01); *F25B 2500/222* (2013.01); *F25B 2600/025* (2013.01); *F25B 2600/11* (2013.01); *F25B 2600/2513* (2013.01); *F25B 2700/04* (2013.01)

(58) Field of Classification Search
CPC .......... F25B 2600/2513; F25B 2700/04; F24F 11/32; F24F 11/38; F24F 11/39
See application file for complete search history.

(56) References Cited

FOREIGN PATENT DOCUMENTS

| | | |
|---|---|---|
| JP | 2015-197226 A | 11/2015 |
| JP | 2015-212594 A | 11/2015 |
| WO | 2006/090451 A1 | 8/2006 |

OTHER PUBLICATIONS

European Search Report of corresponding EP Application No. 20 78 2589.4 dated Mar. 2, 2022.
International Preliminary Report of corresponding PCT Application No. PCT/JP2020/014576 dated Oct. 14, 2021.

\* cited by examiner

PERFORMANCE DEGRADATION DIAGNOSIS SYSTEM FOR REFRIGERATION CYCLE APPARATUS

CROSS-REFERENCE TO RELATED APPLICATIONS

This U.S. National stage application claims priority under 35 U.S.C. § 119(a) to Japanese Patent Application No. 2019-0639315, filed in Japan on Mar. 29, 2019, the entire contents of which are hereby incorporated herein by reference.

BACKGROUND

Field of the Invention

The present disclosure relates to a performance degradation diagnosis system for a refrigeration cycle apparatus.

Background Information

Japanese Unexamined Patent Application Publication No. 2015-212594 discloses a technique of determining the degree of degradation of a compressor of a refrigeration cycle apparatus on the basis of a difference between a determination reference value, which is an operation state amount in an initial state of the compressor, and a determination index, which is an operation state amount when a predetermined time has elapsed.

SUMMARY

However, a cause of performance degradation of a refrigeration cycle apparatus includes not only degradation of a compressor. A plurality of factors, such as soiling of a filter, soiling of a heat exchanger, and refrigerant leakage should be also focused. Grasping of performance degradation of a refrigeration cycle apparatus together with a cause thereof among various performance degradation factors makes it possible to shorten a time for maintenance or the like for alleviating or reducing performance degradation.

A performance degradation diagnosis system according to a first aspect is a performance degradation diagnosis system for a refrigeration cycle apparatus that includes a refrigerant circuit including a compressor, a heat-source-side heat exchanger, and a use-side heat exchanger. The performance degradation diagnosis system includes a determining unit and a control unit. The determining unit determines, based on an index indicating an operation state of the refrigeration cycle apparatus, performance degradation of the refrigeration cycle apparatus with respect to each of a plurality of performance degradation factors of the refrigeration cycle apparatus. In a case where the determining unit determines performance degradation of the refrigeration cycle apparatus with respect to each of the performance degradation factors, the control unit grasps an operation condition of the refrigeration cycle apparatus which is operating, and in a case where the operation condition of the refrigeration cycle apparatus is not suitable for determining performance degradation of the refrigeration cycle apparatus with respect to a performance degradation factor of a determination target, controls the operation condition of the refrigeration cycle apparatus so that the operation condition of the refrigeration cycle apparatus becomes an appropriate operation condition.

In the performance degradation diagnosis system according to the first aspect, the operation condition of the refrigeration cycle apparatus is controlled to the appropriate operation condition suitable for each performance degradation factor of a determination target at the time of determination of performance degradation of the refrigeration cycle apparatus with respect to each of the plurality of performance degradation factors. The appropriate operation condition suitable for each performance degradation factor of a determination target means an operation condition suitable for determining performance degradation of the refrigeration cycle apparatus resulting from the performance degradation factor. With this configuration, a cause of performance degradation can be accurately identified from among various performance degradation factors.

In the performance degradation diagnosis system, for example, the control unit controls the operation condition of the refrigeration cycle apparatus to the appropriate operation condition in a case where the operation condition of the refrigeration cycle apparatus which is operating is an operation condition in which the determining unit is incapable of determining performance degradation of the refrigeration cycle apparatus with respect to the performance degradation factor of the determination target.

In this performance degradation diagnosis system, the operation condition of the refrigeration cycle apparatus is changed in a case where performance degradation of the refrigeration cycle apparatus is not determinable. Thus, it is possible to reduce an influence of performance degradation diagnosis on the operation of the refrigeration cycle apparatus.

A performance degradation diagnosis system according to a second aspect is the performance degradation diagnosis system according to the first aspect, in which the refrigeration cycle apparatus further includes a heat-source-side fan and an expansion valve. The heat-source-side fan supplies air to the heat-source-side heat exchanger. The expansion valve is disposed between the heat-source-side heat exchanger and the use-side heat exchanger in the refrigerant circuit and decompresses refrigerant flowing in the refrigerant circuit. The performance degradation factors include a decrease in an amount of refrigerant. In a case where the determining unit determines performance degradation of the refrigeration cycle apparatus due to the decrease in the amount of refrigerant, and a degree of subcooling in a refrigeration cycle of the refrigeration cycle apparatus which is operating has a value smaller than a first predetermined value, the control unit causes the refrigeration cycle apparatus to execute at least one of an operation of increasing the number of rotations of the compressor, an operation of decreasing the number of rotations of the heat-source-side fan, and an operation of decreasing an opening degree of the expansion valve, to control the operation condition of the refrigeration cycle apparatus to the appropriate operation condition.

In the performance degradation diagnosis system according to the second aspect, at the time of determination of performance degradation of the refrigeration cycle apparatus due to a decrease in the amount of refrigerant, the operation condition of the refrigeration cycle apparatus is changed to an operation condition suitable for the determination. In other words, in the performance degradation diagnosis system according to the second aspect, at the time of determination of performance degradation of the refrigeration cycle apparatus due to the refrigerant leakage, the operation condition of the refrigeration cycle apparatus is changed to an operation condition suitable for determining refrigerant leakage. Thus, in the performance degradation diagnosis system according to the second aspect, performance degradation of the refrigeration cycle apparatus due to the refrigerant leakage can be accurately determined.

A performance degradation diagnosis system according to a third aspect is the performance degradation diagnosis system according to the first aspect, in which the refrigeration cycle apparatus further includes a heat-source-side fan and an expansion valve. The heat-source-side fan supplies air to the heat-source-side heat exchanger. The expansion valve is disposed between the heat-source-side heat exchanger and the use-side heat exchanger in the refrigerant circuit and decompresses refrigerant flowing in the refrigerant circuit. The performance degradation factors include a decrease in an amount of refrigerant. In a case where the determining unit determines performance degradation of the refrigeration cycle apparatus due to the decrease in the amount of refrigerant, and a degree of subcooling in a refrigeration cycle of the refrigeration cycle apparatus which is operating has a value greater than a second predetermined value, the control unit causes the refrigeration cycle apparatus to execute at least one of an operation of decreasing the number of rotations of the compressor, an operation of increasing the number of rotations of the heat-source-side fan, and an operation of increasing an increase of the expansion valve, to control the operation condition of the refrigeration cycle apparatus to the appropriate operation condition.

In the performance degradation diagnosis system according to the third aspect, performance degradation of the refrigeration cycle apparatus due to refrigerant leakage can be accurately determined.

A performance degradation diagnosis system according to a fourth aspect is the performance degradation diagnosis system according to the first aspect, in which the refrigeration cycle apparatus further includes a heat-source-side fan. The heat-source-side fan supplies air to the heat-source-side heat exchanger. The performance degradation factors include soiling of the heat-source-side heat exchanger. In a case where the determining unit determines performance degradation of the refrigeration cycle apparatus due to the soiling of the heat-source-side heat exchanger, the control unit causes the refrigeration cycle apparatus to execute at least one of an operation of increasing the number of rotations of the compressor and an operation of decreasing the number of rotations of the heat-source-side fan, to control the operation condition of the refrigeration cycle apparatus which is operating to the appropriate operation condition.

In the performance degradation diagnosis system according to the fourth aspect, performance degradation of the refrigeration cycle apparatus due to soiling of the heat-source-side heat exchanger can be accurately determined.

A performance degradation diagnosis system according to a fifth aspect is the performance degradation diagnosis system according to any one of the first aspect to the fourth aspect, in which the refrigeration cycle apparatus further includes a use-side fan and a filter. The use-side fan supplies air to the use-side heat exchanger. The filter removes a foreign substance from the air to be supplied to the use-side heat exchanger. The performance degradation factors include at least one of soiling of the use-side heat exchanger and soiling of the filter. In a case where the determining unit determines performance degradation of the refrigeration cycle apparatus due to at least one of the soiling of the use-side heat exchanger and the soiling of the filter, the control unit causes the refrigeration cycle apparatus to execute at least one of an operation of increasing the number of rotations of the compressor and an operation of decreasing the number of rotations of the use-side fan, to control the operation condition of the refrigeration cycle apparatus which is operating to the appropriate operation condition.

In the performance degradation diagnosis system according to the fifth aspect, performance degradation of the refrigeration cycle apparatus due to soiling of the use-side heat exchanger or the filter can be accurately determined.

A performance degradation diagnosis system according to a sixth aspect is the performance degradation diagnosis system according to the first aspect, in which the refrigeration cycle apparatus further includes a heat-source-side fan and an expansion valve. The heat-source-side fan supplies air to the heat-source-side heat exchanger. The expansion valve is disposed between the heat-source-side heat exchanger and the use-side heat exchanger in the refrigerant circuit and decompresses refrigerant flowing in the refrigerant circuit. In a case where a degree of subcooling in a refrigeration cycle of the refrigeration cycle apparatus which is operating has a value smaller than or equal to a third predetermined value, the control unit causes the refrigeration cycle apparatus to execute at least one of an operation of increasing the number of rotations of the compressor, an operation of increasing the number of rotations of the heat-source-side fan, and an operation of decreasing an opening degree of the expansion valve, to control the operation condition of the refrigeration cycle apparatus to the appropriate operation condition.

In the performance degradation diagnosis system according to the sixth aspect, the operation condition of the refrigeration cycle apparatus is controlled to a condition suitable for determining performance degradation of the refrigeration cycle apparatus, and thus the presence or absence of performance degradation can be accurately detected.

A performance degradation diagnosis system according to a seventh aspect is the performance degradation diagnosis system according to the first aspect, in which the refrigeration cycle apparatus further includes a heat-source-side fan and an expansion valve. The heat-source-side fan supplies air to the heat-source-side heat exchanger. The expansion valve is disposed between the heat-source-side heat exchanger and the use-side heat exchanger in the refrigerant circuit and decompresses refrigerant flowing in the refrigerant circuit. In a case where a degree of superheating in a refrigeration cycle of the refrigeration cycle apparatus which is operating has a value smaller than or equal to a fourth predetermined value, the control unit causes the refrigeration cycle apparatus to execute at least one of an operation of increasing the number of rotations of the compressor, an operation of increasing the number of rotations of the heat-source-side fan, and an operation of decreasing an opening degree of the expansion valve, to control the operation condition of the refrigeration cycle apparatus to the appropriate operation condition.

In the performance degradation diagnosis system according to the seventh aspect, the operation condition of the refrigeration cycle apparatus is controlled to a condition suitable for determining performance degradation of the refrigeration cycle apparatus, and thus the presence or absence of performance degradation can be accurately detected.

A performance degradation diagnosis system according to an eighth aspect is the performance degradation diagnosis system according to any one of the first aspect to the seventh aspect, in which the performance degradation diagnosis system further includes an overall determining unit that determines overall performance degradation of the refrigeration cycle apparatus. In a case where the overall determining unit determines that the refrigeration cycle apparatus has the overall performance degradation, the determining unit determines performance degradation of the refrigeration cycle apparatus with respect to each of the plurality of performance degradation factors.

In the performance degradation diagnosis system according to the eighth aspect, in a case where there is overall performance degradation, performance degradation of the refrigeration cycle apparatus is determined with respect to each of performance degradation factors. Thus, it is possible to minimize the occurrence of a problem in which normal operation is interrupted by the operation of the refrigeration cycle apparatus in which the operation condition is changed for diagnosing the performance degradation.

DETAILED DESCRIPTION OF EMBODIMENT(S)

A performance degradation diagnosis system 200 according to one embodiment of the present disclosure will be described with reference to the drawings.

(1) Overall Configuration

An overview of the performance degradation diagnosis system 200 according to the one embodiment of the present disclosure and an air conditioning apparatus 100 which is a diagnosis target of the performance degradation diagnosis system 200 will be described with reference to FIG. 1 and FIG. 2.

Figure 1:
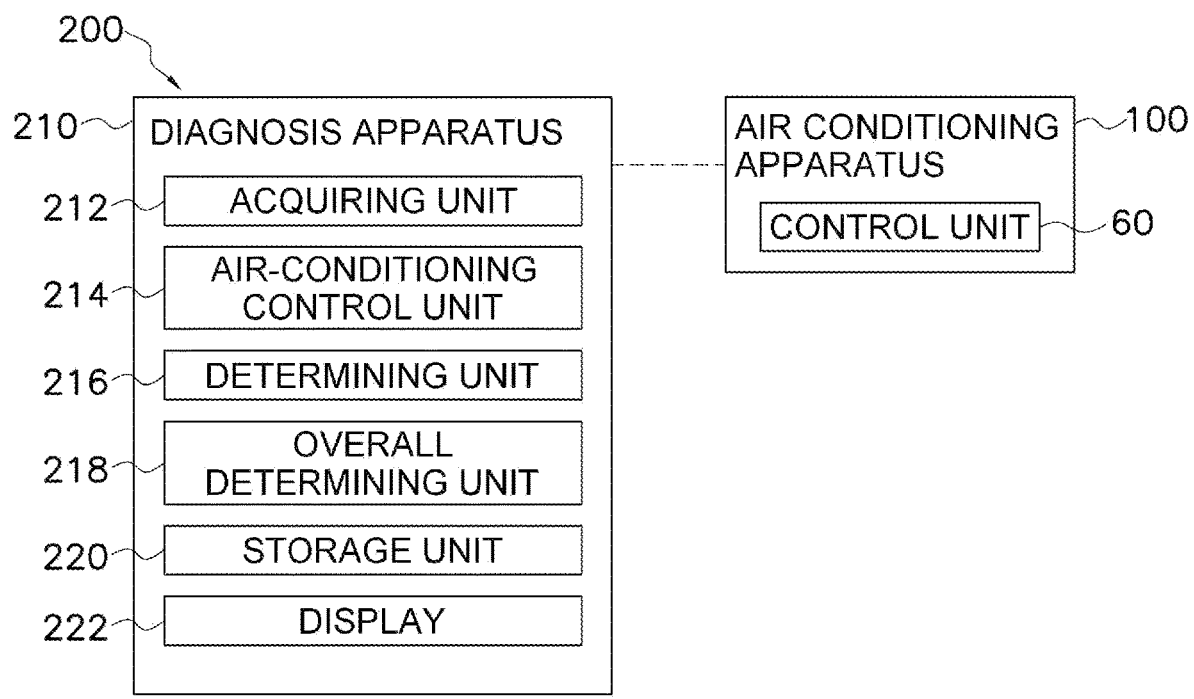
FIG. 1 is a block diagram of a performance degradation diagnosis system according to one embodiment of the present disclosure.

FIG. 1 is a block diagram of the performance degradation diagnosis system 200. FIG. 2 is a schematic configuration diagram of the air conditioning apparatus 100 which is a diagnosis target of the performance degradation diagnosis system 200.

The air conditioning apparatus 100 is an example of a refrigeration cycle apparatus. The air conditioning apparatus 100 is an apparatus that uses a vapor compression refrigeration cycle. The air conditioning apparatus 100 includes a refrigerant circuit 10 including a compressor 21, a heat-source-side heat exchanger 23, and a use-side heat exchanger 52 (see FIG. 2). The refrigeration cycle apparatus is not limited to an air conditioning apparatus. The refrigeration cycle apparatus includes, for example, a refrigerator, a freezer, a water heater, a floor heater, and the like.

The air conditioning apparatus 100 is an air conditioning apparatus that cools (including dehumidifies) and heats an air conditioning target space. The air conditioning apparatus is not limited to an air conditioning apparatus capable of performing cooling and heating. For example, the air conditioning apparatus may be an air conditioning apparatus dedicated to cooling.

The performance degradation diagnosis system 200 is a system that diagnoses performance degradation of the air conditioning apparatus 100 with respect to each of a plurality of performance degradation factors. In the present embodiment, the performance degradation diagnosis system 200 diagnoses performance degradation of the air conditioning apparatus 100 with respect to each of three performance degradation factors: a decrease in the amount of refrigerant sealed in the refrigerant circuit 10; soiling of the heat-source-side heat exchanger 23; and soiling of the use-side heat exchanger 52. The performance degradation diagnosis system 200 may diagnose performance degradation of the air conditioning apparatus 100 with respect to any two of the three performance degradation factors. The performance degradation diagnosis system 200 may diagnose performance degradation of the air conditioning apparatus 100 with respect to soiling of a filter 58 provided in a use unit 50 described below, instead of or in addition to diagnosing performance degradation of the air conditioning apparatus 100 with respect to soiling of the use-side heat exchanger 52.

The performance degradation diagnosis system 200 mainly includes a diagnosis apparatus 210 having a function of diagnosing performance degradation of the air conditioning apparatus 100 (see FIG. 1). In the present embodiment, the diagnosis apparatus 210 is a computer installed in a site in which the air conditioning apparatus 100 is installed. Preferably, the diagnosis apparatus 210 is connected to the air conditioning apparatus 100 so as to be capable of communicating therewith.

Hereinafter, details of the air conditioning apparatus 100 and the performance degradation diagnosis system 200 will be described.

(2) Air Conditioning Apparatus

Details of the air conditioning apparatus 100 will be described.

Figure 2:
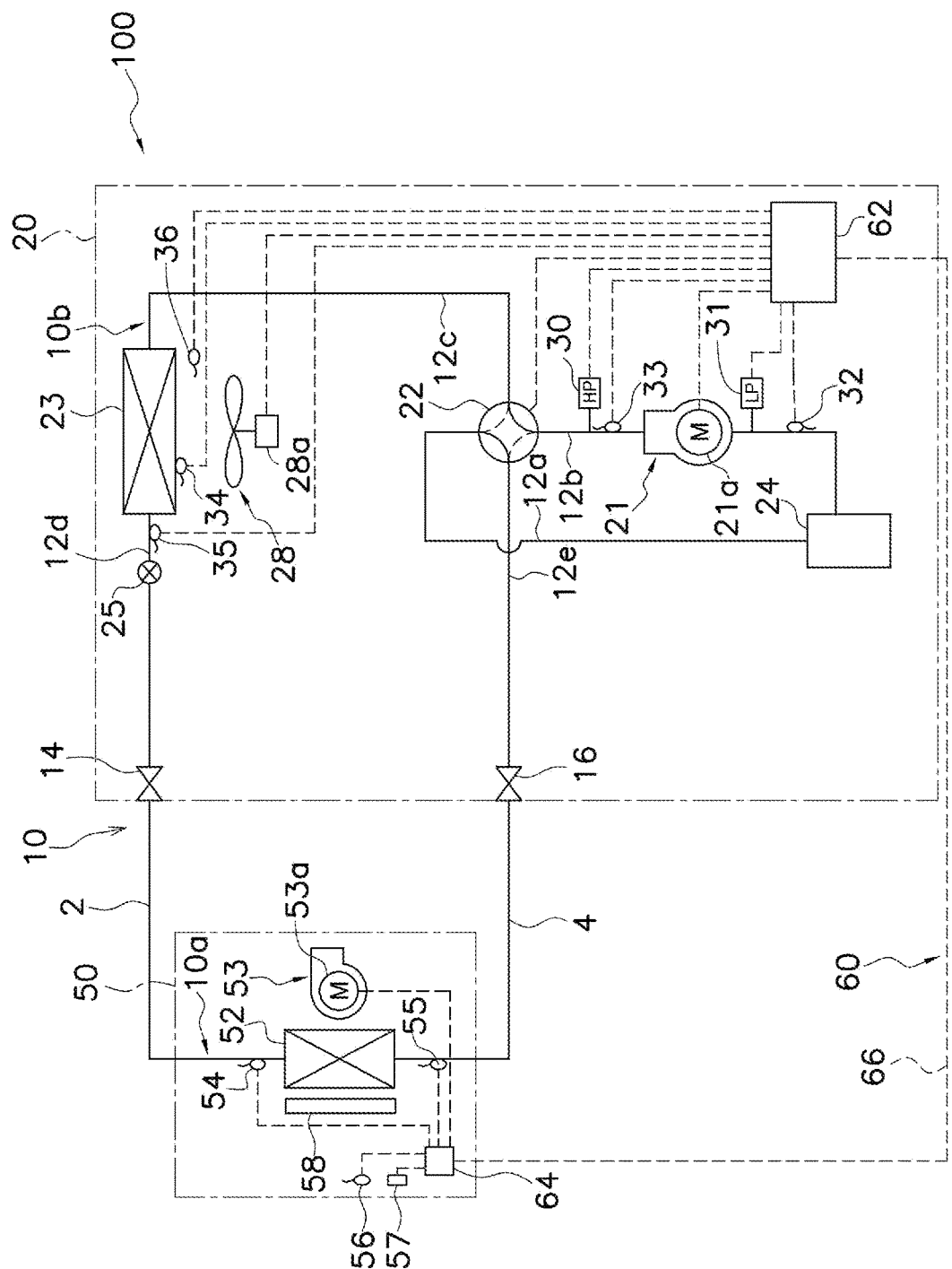
FIG. 2 is a schematic configuration diagram of an air conditioning apparatus which is a diagnosis target of the performance degradation diagnosis system in FIG. 1.

The air conditioning apparatus 100 mainly includes one heat source unit 20, one use unit 50, a liquid-refrigerant connection pipe 2 and a gas-refrigerant connection pipe 4, and a control unit 60 (see FIG. 2). The liquid-refrigerant connection pipe 2 and the gas-refrigerant connection pipe 4 are pipes that connect the heat source unit 20 and the use unit 50 (see FIG. 2). The control unit 60 controls operations of various devices or various components of the heat source unit 20 and the use unit 50.

The air conditioning apparatus 100 according to the present embodiment includes one use unit 50. The number of use units 50 is not limited to one and may be two or more. The air conditioning apparatus 100 according to the present embodiment includes one heat source unit 20. The number of heat source units 20 is not limited to one and may be two or more. The air conditioning apparatus 100 may be an integral apparatus in which the heat source unit 20 and the use unit 50 are incorporated in a single unit.

The heat source unit 20 and the use unit 50 are connected via the liquid-refrigerant connection pipe 2 and the gas-refrigerant connection pipe 4, thereby forming the refrigerant circuit 10 (see FIG. 2). Refrigerant is sealed in the refrigerant circuit 10. The refrigerant sealed in the refrigerant circuit 10 is not limited and is, for example, fluorocarbon refrigerant such as R32. The refrigerant circuit 10 includes the compressor 21, a flow direction switching mechanism 22, the heat-source-side heat exchanger 23, and an expansion mechanism 25 of the heat source unit 20, and the use-side heat exchanger 52 of the use unit 50 (see FIG. 2).

The air conditioning apparatus 100 has, as main operation modes, a cooling operation mode of executing a cooling operation and a heating operation mode of executing a heating operation. The cooling operation is an operation of cooling air in a space in which the use unit 50 is installed, while causing the heat-source-side heat exchanger 23 to function as a radiator (condenser) of refrigerant and causing the use-side heat exchanger 52 to function as an evaporator of refrigerant. The heating operation is an operation of heating air in a space in which the use unit 50 is installed, while causing the heat-source-side heat exchanger 23 to function as an evaporator of refrigerant and causing the use-side heat exchanger 52 to function as a radiator of refrigerant. During a heating operation, the air conditioning apparatus 100 suspends the heating operation and performs a defrosting operation. The defrosting operation is an operation for removing frost adhered to the heat-source-side heat exchanger 23, while causing the heat-source-side heat exchanger 23 to function as a radiator of refrigerant and causing the use-side heat exchanger 52 to function as an evaporator of refrigerant.

(2-1) Use Unit

The use unit 50 is a unit installed in an air conditioning target space. For example, the use unit 50 is a ceiling-embedded unit. The use unit 50 of the air conditioning apparatus 100 is not limited to a ceiling-embedded type, and one or both may be of a ceiling-hung type, a wall-hung type, or a floor-standing type. The use unit 50 may be installed outside an air conditioning target space. For example, the use unit 50 may be installed in an attic, a machine chamber, a garage, or the like. In this case, an air path for supplying air that has exchanged heat with refrigerant in the use-side heat exchanger 52 is installed from the use unit 50 to an air conditioning target space. The air path is, for example, a duct. The type of air path is not limited to a duct and may be selected as appropriate.

The use unit 50 is connected to the heat source unit 20 via the liquid-refrigerant connection pipe 2 and the gas-refrigerant connection pipe 4 and constitutes a part of the refrigerant circuit 10, as described above.

The use unit 50 includes a use-side refrigerant circuit 10a constituting a part of the refrigerant circuit 10 (see FIG. 2). The use-side refrigerant circuit 10a mainly includes the use-side heat exchanger 52 (see FIG. 2). The use unit 50 includes a use-side fan 53 driven by a motor 53a (see FIG. 2). The use unit 50 includes the filter 58 (see FIG. 2). The use unit 50 includes various sensors. In the present embodiment, the various sensors included in the use unit 50 include a liquid-side temperature sensor 54, a gas-side temperature sensor 55, a space temperature sensor 56, and a space humidity sensor 57 (see FIG. 2). The use unit 50 includes a use-side control unit 64 that controls an operation of the use unit 50 (see FIG. 2).

(2-1-1) Use-Side Heat Exchanger

In the use-side heat exchanger 52, heat exchange is performed between refrigerant flowing in the use-side heat exchanger 52 and air in an air conditioning target space. The use-side heat exchanger 52 is not limited in type and is, for example, a fin-and-tube heat exchanger including a plurality of heat transfer tubes and fins that are not illustrated.

One end of the use-side heat exchanger 52 is connected to the liquid-refrigerant connection pipe 2 via a refrigerant pipe. The other end of the use-side heat exchanger 52 is connected to the gas-refrigerant connection pipe 4 via a refrigerant pipe. During a cooling operation and a defrosting operation, refrigerant flows into the use-side heat exchanger 52 from the liquid-refrigerant connection pipe 2 side, and the use-side heat exchanger 52 functions as an evaporator of the refrigerant. During a heating operation, refrigerant flows into the use-side heat exchanger 52 from the gas-refrigerant connection pipe 4 side, and the use-side heat exchanger 52 functions as a radiator of the refrigerant.

(2-1-2) Use-Side Fan

The use-side fan 53 is a fan that supplies air to the use-side heat exchanger 52. In the use unit 50, the filter 58, the use-side heat exchanger 52, and the use-side fan 53 are disposed in this order from an upstream side toward a downstream side in the direction of an airflow generated by the use-side fan 53, as indicated by a two-dot-chain-line arrow in FIG. 2. The order of disposition of the filter 58, the use-side heat exchanger 52, and the use-side fan 53 is not limited to the order illustrate in FIG. 2. For example, the filter 58, the use-side fan 53, and the use-side heat exchanger 52 may be disposed in this order from an upstream side toward a downstream side in the direction of an airflow generated by the use-side fan 53. The use-side fan 53 is, for example, a turbofan. The type of the use-side fan 53 is not limited to a turbofan and may be selected as appropriate.

The use-side fan 53 is driven by the motor 53a. The use-side fan 53 is a variable-air-volume fan driven by the motor 53a capable of changing the number of rotations.

(2-1-3) Filter

The filter 58 removes a foreign substance, such as dust, from the air to be supplied to the use-side heat exchanger 52 by the use-side fan 53. The filter 58 is disposed upstream of the use-side heat exchanger 52 in the direction of an airflow generated by the use-side fan 53.

(2-1-4) Sensors

The use unit 50 includes, as sensors, the liquid-side temperature sensor 54, the gas-side temperature sensor 55, the space temperature sensor 56, and the space humidity sensor 57 (see FIG. 2). The types of temperature sensor and humidity sensor may be selected as appropriate.

The use unit 50 may include only one or some of the sensors 54 to 57. The use unit 50 may include a sensor other than the sensors 54 to 57.

The liquid-side temperature sensor 54 is provided in a refrigerant pipe that connects the liquid side of the use-side heat exchanger 52 and the liquid-refrigerant connection pipe 2. The liquid-side temperature sensor 54 measures the temperature of refrigerant flowing through the refrigerant pipe on the liquid side of the use-side heat exchanger 52.

The gas-side temperature sensor 55 is provided in a refrigerant pipe that connects the gas side of the use-side heat exchanger 52 and the gas-refrigerant connection pipe 4. The gas-side temperature sensor 55 measures the temperature of refrigerant flowing through the refrigerant pipe on the gas side of the use-side heat exchanger 52.

The space temperature sensor 56 is provided at an air intake side of a casing (not illustrated) of the use unit 50. The space temperature sensor 56 detects the temperature of air in an air conditioning target space (space temperature Tr) flown into the casing of the use unit 50.

The space humidity sensor 57 is provided at an air intake side of the casing (not illustrated) of the use unit 50. The space humidity sensor 57 detects the humidity of air in an air conditioning target space (space humidity Hr) flown into the casing of the use unit 50.

(2-1-5) Use-Side Control Unit

The use-side control unit 64 controls operations of individual portions constituting the use unit 50.

The use-side control unit 64 includes a microcomputer provided for controlling the use unit 50, a memory storing a control program executable by the microcomputer, and so forth. The configuration of the use-side control unit 64 described here is merely an example. The function of the use-side control unit 64 described below may be implemented by any of software, hardware, and a combination of software and hardware.

The use-side control unit 64 is electrically connected to the use-side fan 53, the liquid-side temperature sensor 54, the gas-side temperature sensor 55, the space temperature sensor 56, and the space humidity sensor 57 so as to be capable of transmitting/receiving control signals or information thereto/therefrom (see FIG. 2).

The use-side control unit 64 is configured to be capable of receiving various signals transmitted from a remote controller (not illustrated) for operating the use unit 50. The various signals transmitted from the remote controller include a signal of providing an instruction to activate/deactivate the use unit 50, and signals related to various settings. The signals related to various settings include, for example, an operation mode switch signal, and a signal related to a set temperature Trs or a set humidity Hrs of a cooling operation or a heating operation.

The use-side control unit 64 is connected to a heat-source-side control unit 62 of the heat source unit 20 in a state of being capable of transmitting/receiving control signals and the like thereto/therefrom through a transmission line 66. The use-side control unit 64 and the heat-source-side control unit 62 need not be connected by the physical transmission line 66, and may be connected so as to be capable of wirelessly communicating with each other. The use-side control unit 64 and the heat-source-side control unit 62 cooperate with each other to function as the control unit 60 that controls an operation of the entire air conditioning apparatus 100. The control unit 60 will be described later.

(2-2) Heat Source Unit

The heat source unit 20 is disposed outside an air conditioning target space. The heat source unit 20 is installed, for example, on a roof of a building in which the air conditioning apparatus 100 is installed or adjacent to the building.

The heat source unit 20 is connected to the use unit 50 via the liquid-refrigerant connection pipe 2 and the gas-refrigerant connection pipe 4. The heat source unit 20 constitutes, together with the use unit 50, the refrigerant circuit 10 (see FIG. 2).

The heat source unit 20 includes a heat-source-side refrigerant circuit 10b constituting a part of the refrigerant circuit 10 (see FIG. 2). The heat-source-side refrigerant circuit 10b mainly includes the compressor 21, the flow direction switching mechanism 22, the heat-source-side heat exchanger 23, the expansion mechanism 25, an accumulator 24, a liquid-side shutoff valve 14, and a gas-side shutoff valve 16 (see FIG. 2). The heat source unit 20 includes a heat-source-side fan 28 driven by a motor 28a (see FIG. 2). The heat source unit 20 includes various sensors. The sensors included in the heat source unit 20 will be described later. The heat source unit 20 includes the heat-source-side control unit 62 (see FIG. 2).

The heat source unit 20 need not necessarily include all of the above-described elements. The elements of the heat source unit 20 may be selected as appropriate. For example, the heat source unit 20 need not include the expansion mechanism 25 as a constituent. The use unit 50, instead of the heat source unit 20, may include a similar expansion mechanism.

The heat source unit 20 also includes a suction pipe 12a, a discharge pipe 12b, a first gas-refrigerant pipe 12c, a liquid-refrigerant pipe 12d, and a second gas-refrigerant pipe 12e (see FIG. 2). The suction pipe 12a connects the flow direction switching mechanism 22 and a suction side of the compressor 21 (see FIG. 2). The suction pipe 12a is provided with the accumulator 24 (see FIG. 2). The discharge pipe 12b connects a discharge side of the compressor 21 and the flow direction switching mechanism 22 (see FIG. 2). The first gas-refrigerant pipe 12c connects the flow direction switching mechanism 22 and the gas side of the heat-source-side heat exchanger 23 (see FIG. 2). The liquid-refrigerant pipe 12d connects the liquid side of the heat-source-side heat exchanger 23 and the liquid-refrigerant connection pipe 2 (see FIG. 2). The liquid-refrigerant pipe 12d is provided with the expansion mechanism 25 (see FIG. 2). The liquid-side shutoff valve 14 is provided at a connection portion between the liquid-refrigerant pipe 12d and the liquid-refrigerant connection pipe 2 (see FIG. 2). The second gas-refrigerant pipe 12e connects the flow direction switching mechanism 22 and the gas-refrigerant connection pipe 4 (see FIG. 2). The gas-side shutoff valve 16 is provided at a connection portion between the second gas-refrigerant pipe 12e and the gas-refrigerant connection pipe 4 (see FIG. 2).

Hereinafter, a main configuration of the heat source unit 20 will be further described.

(2-2-1) Compressor

The compressor 21 is a device that sucks low-pressure refrigerant in a refrigeration cycle from the suction pipe 12a, compresses the refrigerant by using a compression mechanism which is not illustrated, and discharges the compressed refrigerant to the discharge pipe 12b. In the present embodiment, the heat source unit 20 includes only one compressor 21. The number of compressors 21 is not limited to one and may be two or more.

The type of the compressor 21 is not limited. For example, the compressor 21 is a positive-displacement compressor of a rotary type, a scroll type, or the like. The compression mechanism which is not illustrated of the compressor 21 is driven by a motor 21a (see FIG. 2). The compression mechanism (not illustrated) is driven by the motor 21a, and thereby refrigerant is compressed by the compression mechanism. The motor 21a is a motor capable of controlling the number of rotations by using an inverter. As a result of the number of rotations of the motor 21a being controlled, the capacity of the compressor 21 is controlled. The compression mechanism of the compressor 21 may be driven by a prime mover (for example, an internal combustion engine) other than a motor.

(2-2-2) Flow Direction Switching Mechanism

The flow direction switching mechanism 22 is a mechanism that switches the flow direction of refrigerant to change the state of the refrigerant circuit 10 between a first state and a second state. When the refrigerant circuit 10 is in the first state, the heat-source-side heat exchanger 23 functions as a radiator of refrigerant, whereas the use-side heat exchanger 52 functions as an evaporator of refrigerant. When the refrigerant circuit 10 is in the second state, the heat-source-side heat exchanger 23 functions as an evaporator of refrigerant, whereas the use-side heat exchanger 52 functions as a radiator of refrigerant.

In the present embodiment, the flow direction switching mechanism 22 is a four-way switching valve. However, the flow direction switching mechanism 22 is not limited to a four-way switching valve. For example, the flow direction switching mechanism 22 may be configured by combining a plurality of electromagnetic valves and refrigerant pipes so as to be capable of implementing switching of the flow direction of refrigerant described below.

During a cooling operation and a defrosting operation, the flow direction switching mechanism 22 brings the refrigerant circuit 10 into the first state. In other words, during a cooling operation and a defrosting operation, the flow direction switching mechanism 22 causes the suction pipe 12a to communicate with the second gas-refrigerant pipe 12e and causes the discharge pipe 12b to communicate with the first gas-refrigerant pipe 12c (see the solid lines in the flow direction switching mechanism 22 in FIG. 2).

During a heating operation, the flow direction switching mechanism 22 brings the refrigerant circuit 10 into the second state. In other words, during a heating operation, the flow direction switching mechanism 22 causes the suction pipe 12a to communicate with the first gas-refrigerant pipe 12c and causes the discharge pipe 12b to communicate with the second gas-refrigerant pipe 12e (see the broken lines in the flow direction switching mechanism 22 in FIG. 2).

(2-2-3) Heat-Source-Side Heat Exchanger

In the heat-source-side heat exchanger 23, heat exchange is performed between refrigerant flowing therein and air in a place where the heat source unit 20 is installed (heat source air). In a case where the heat source unit 20 is installed outdoors, heat exchange is performed in the heat-source-side heat exchanger 23 between refrigerant flowing therein and outdoor air.

The heat-source-side heat exchanger 23 is not limited in type and is, for example, a fin-and-tube heat exchanger including a plurality of heat transfer tubes and fins that are not illustrated.

One end of the heat-source-side heat exchanger 23 is connected to the liquid-refrigerant pipe 12d. The other end of the heat-source-side heat exchanger 23 is connected to the first gas-refrigerant pipe 12c.

The heat-source-side heat exchanger 23 functions as a radiator of refrigerant during a cooling operation, during a dehumidifying operation, and during a defrosting operation, and functions as an evaporator of refrigerant during a heating operation.

(2-2-4) Expansion Mechanism

In the refrigerant circuit 10, the expansion mechanism 25 is disposed between the heat-source-side heat exchanger 23 and the use-side heat exchanger 52 (see FIG. 2). The expansion mechanism 25 is disposed in the liquid-refrigerant pipe 12d between the heat-source-side heat exchanger 23 and the liquid-side shutoff valve 14 (see FIG. 2). In a case where the heat source unit 20 does not include the expansion mechanism 25 and the use unit 50 includes an expansion mechanism similar to the expansion mechanism 25, the expansion mechanism may be provided in a refrigerant pipe that connects the liquid-refrigerant connection pipe 2 and the use-side heat exchanger 52 in the use unit 50.

The expansion mechanism 25 adjusts the pressure and flow rate of refrigerant flowing in the refrigerant circuit 10. In the present embodiment, the expansion mechanism 25 is a variable-opening-degree electronic expansion valve. However, the expansion mechanism 25 is not limited to an electronic expansion valve. The expansion mechanism 25 may be a temperature-sensitive-cylinder expansion valve or a capillary tube.

(2-2-5) Accumulator

The accumulator 24 has a gas-liquid separation function of separating refrigerant that has flowed thereinto into gas refrigerant and liquid refrigerant. The accumulator 24 is a container having a function of accumulating surplus refrigerant generated in accordance with a variation or the like of an operation load of the use unit 50. The accumulator 24 is provided in the suction pipe 12a (see FIG. 2). The refrigerant that has flowed into the accumulator 24 is separated into gas refrigerant and liquid refrigerant, and the gas refrigerant collected in an upper space flows into the compressor 21.

(2-2-6) Liquid-Side Shutoff Valve and Gas-Side Shutoff Valve

The liquid-side shutoff valve 14 is a valve provided at a connection portion between the liquid-refrigerant pipe 12d and the liquid-refrigerant connection pipe 2. The gas-side shutoff valve 16 is a valve provided at a connection portion between the second gas-refrigerant pipe 12e and the gas-refrigerant connection pipe 4. The liquid-side shutoff valve 14 and the gas-side shutoff valve 16 are, for example, valves operated manually.

(2-2-7) Heat-Source-Side Fan

The heat-source-side fan 28 is a fan that supplies air to the heat-source-side heat exchanger 23. Specifically, the heat-source-side fan 28 is a fan for sucking heat source air outside the heat source unit 20 into a casing that is not illustrated of the heat source unit 20, supplying the heat source air to the heat-source-side heat exchanger 23, and discharging air that has exchanged heat with refrigerant in the heat-source-side heat exchanger 23 to the outside of the casing of the heat source unit 20.

The heat-source-side fan 28 is, for example, a propeller fan. The type of the heat-source-side fan 28 is not limited to a propeller fan and may be selected as appropriate.

The heat-source-side fan 28 is driven by the motor 28a (see FIG. 2). The heat-source-side fan 28 is a variable-air-volume fan driven by the motor 28a capable of changing the number of rotations.

(2-2-8) Sensors

The heat source unit 20 is provided with various sensors. For example, the heat source unit 20 includes the following temperature sensors and pressure sensors. The types of temperature sensors and pressure sensors may be selected as appropriate.

The sensors included in the heat source unit 20 include a discharge pressure sensor 30, a suction pressure sensor 31, a suction temperature sensor 32, a discharge temperature sensor 33, a heat exchange temperature sensor 34, a liquid-side temperature sensor 35, and a heat source air temperature sensor 36 (see FIG. 2). The heat source unit 20 may include only one or some of the above-described sensors 30 to 36. The heat source unit 20 may include a sensor other than the above-described sensors 30 to 36.

The discharge pressure sensor 30 is provided in the discharge pipe 12b (see FIG. 2). The discharge pressure sensor 30 is a sensor that measures a discharge pressure Pd.

The suction pressure sensor 31 is provided in the suction pipe 12a (see FIG. 2). The suction pressure sensor 31 is a sensor that measures a suction pressure Ps.

The suction temperature sensor 32 is provided in the suction pipe 12a (see FIG. 2). The suction temperature sensor 32 is a sensor that measures a suction temperature Ts.

The discharge temperature sensor 33 is provided in the discharge pipe 12b (see FIG. 2). The discharge temperature sensor 33 is a sensor that measures a discharge temperature Td.

The heat exchange temperature sensor 34 is provided in the heat-source-side heat exchanger 23 (see FIG. 2). The heat exchange temperature sensor 34 measures the temperature of refrigerant flowing in the heat-source-side heat exchanger 23. The heat exchange temperature sensor 34 measures a refrigerant temperature corresponding to a condensation temperature Tc during a cooling operation, and measures a refrigerant temperature corresponding to an evaporation temperature Te during a heating operation.

The liquid-side temperature sensor 35 is provided in the liquid-refrigerant pipe 12d (the liquid side of the heat-source-side heat exchanger 23) and measures a temperature Tl of refrigerant flowing through the liquid-refrigerant pipe 12d. When the heat-source-side heat exchanger 23 is in the first state, the temperature Tl of refrigerant measured by the liquid-side temperature sensor 35 is subtracted from the condensation temperature Tc measured by the heat exchange temperature sensor 34, and thereby a degree of subcooling SCr of a refrigeration cycle is calculated.

The heat source air temperature sensor 36 measures the temperature of heat source air.

(2-2-9) Heat-Source-Side Control Unit

The heat-source-side control unit 62 controls operations of individual portions constituting the heat source unit 20.

The heat-source-side control unit 62 includes a microcomputer provided for controlling the heat source unit 20, a memory storing a control program executable by the microcomputer, and so forth. The configuration of the heat-source-side control unit 62 described here is merely an example. The function of the heat-source-side control unit 62 described below may be implemented by any of software, hardware, and a combination of software and hardware.

The heat-source-side control unit 62 is electrically connected to the compressor 21, the flow direction switching mechanism 22, the expansion mechanism 25, the heat-source-side fan 28, the discharge pressure sensor 30, the suction pressure sensor 31, the suction temperature sensor 32, the discharge temperature sensor 33, the heat exchange temperature sensor 34, the liquid-side temperature sensor 35, and the heat source air temperature sensor 36 so as to be capable of transmitting/receiving control signals or information thereto/therefrom (see FIG. 2).

The heat-source-side control unit 62 is connected to the use-side control unit 64 of the use unit 50 in a state of being capable of transmitting/receiving control signals and the like thereto/therefrom through the transmission line 66. The heat-source-side control unit 62 and the use-side control unit 64 cooperate with each other to function as the control unit 60 that controls an operation of the entire air conditioning apparatus 100. The control unit 60 will be described below.

(2-3) Connection Pipes

The air conditioning apparatus 100 includes, as connection pipes, the liquid-refrigerant connection pipe 2 and the gas-refrigerant connection pipe 4. The liquid-refrigerant connection pipe 2 and the gas-refrigerant connection pipe 4 are pipes installed in an installation site of the air conditioning apparatus 100 at the time of installation of the air conditioning apparatus 100. The use-side refrigerant circuit 10a of the use unit 50 and the heat-source-side refrigerant circuit 10b of the heat source unit 20 are connected by the liquid-refrigerant connection pipe 2 and the gas-refrigerant connection pipe 4, and thereby the refrigerant circuit 10 of the air conditioning apparatus 100 is configured.

(2-4) Control Unit

The control unit 60 is configured as a result of the heat-source-side control unit 62 of the heat source unit 20 and the use-side control unit 64 of the use unit 50 being connected via the transmission line 66 so as to be capable of communicating with each other. The control unit 60 controls an operation of the entire air conditioning apparatus 100 as a result of the microcomputers of the heat-source-side control unit 62 and the use-side control unit 64 executing the programs stored in the memories.

In the present embodiment, the heat-source-side control unit 62 and the use-side control unit 64 constitute the control unit 60, but the configuration of the control unit 60 is not limited thereto.

For example, the air conditioning apparatus 100 may include a control device that implements some or all of the functions of the control unit 60 described below, in addition to the heat-source-side control unit 62 and the use-side control unit 64 or instead of the heat-source-side control unit 62 and the use-side control unit 64. This control device may be a device dedicated to control the air conditioning apparatus 100 or may be a device that controls a plurality of air conditioning apparatuses including the air conditioning apparatus 100. The control device may be a server installed in a place other than the place in which the air conditioning apparatus 100 is installed.

As illustrated in FIG. 2, the control unit 60 is electrically connected to various devices of the heat source unit 20 and the use unit 50, including the compressor 21, the flow direction switching mechanism 22, the expansion mechanism 25, the heat-source-side fan 28, and the use-side fan 53. As illustrated in FIG. 2, the control unit 60 is electrically connected to the various sensors 30 to 36 provided in the heat source unit 20 and the various sensors 54 to 57 provided in the use unit 50.

The control unit 60 controls activation and deactivation of the air conditioning apparatus 100 and operations of the various devices 21, 22, 25, 28, 53, and so forth of the air conditioning apparatus 100 on the basis of measurement signals of the various sensors 30 to 36 and 54 to 57, instructions received by the use-side control unit 64 from the remote controller that is not illustrated, and so forth.

The control unit 60 is connected to the diagnosis apparatus 210 of the performance degradation diagnosis system 200 so as to be capable of communicating therewith via a communication line. The communication line may be wired or wireless. The control unit 60 transmits measurement values of the sensors 30 to 36 and 54 to 57 to the diagnosis apparatus 210 via the communication line. The control unit 60 transmits information indicating the number of rotations of the motor 21a of the compressor 21, the number of rotations of the motor 28a of the heat-source-side fan 28, and the number of rotations of the motor 53a of the use-side fan 53 to the diagnosis apparatus 210 via the communication line. The control unit 60 may calculate a value by using at least one of the measurement values of the sensors 30 to 36 and 54 to 57 and the numbers of rotations of the motors 21a, 28a, and 53a and transmit the calculated value to the diagnosis apparatus 210 via the communication line, in addition to or instead of transmitting some or all of the measurement values of the sensors 30 to 36 and 54 to 57 and the numbers of rotations of the motors 21a, 28a, and 53a. The control unit 60 may transmit a set temperature or the like of the air conditioning apparatus 100 to the diagnosis apparatus 210 via the communication line.

The control unit 60 controls operations of various devices of the air conditioning apparatus 100 on the basis of instructions from the performance degradation diagnosis system 200. A description of control of operations of the air conditioning apparatus 100 performed by the control unit 60 on the basis of instructions from the performance degradation diagnosis system 200 will be given later together with a description of the performance degradation diagnosis system 200.

(2-5) Operation of Air Conditioning Apparatus

Control of operations of the air conditioning apparatus 100 during a cooling operation and a heating operation will be described.

(2-5-1) Operation During Cooling Operation

In response to an instruction to execute a cooling operation provided to the air conditioning apparatus 100, the control unit 60 sets the operation mode of the air conditioning apparatus 100 to the cooling operation mode. The control unit 60 controls the flow direction switching mechanism 22 to the state indicated by the solid lines in FIG. 2 so that the refrigerant circuit 10 enters the above-described first state, and operates the compressor 21, the heat-source-side fan 28, and the use-side fan 53.

During the cooling operation, the control unit 60 controls the devices of the air conditioning apparatus 100 in the following manner, for example. The control of the operation of the air conditioning apparatus 100 during the cooling operation described here is merely an example, and does not limit the method of controlling the air conditioning apparatus 100 by the control unit 60 during the cooling operation. For example, the control unit 60 may control operations of various devices on the basis of variables other than those described here.

The control unit 60 controls each of the number of rotations of the motor 28a that drives the heat-source-side fan 28 and the number of rotations of the motor 53a that drives the use-side fan 53 to a predetermined number of rotations. The control unit 60 controls, for example, the number of rotations of the motor 28a to a maximum number of rotations. The control unit 60 controls the number of rotations of the motor 53a as appropriate on the basis of an instruction or the like about an air volume input to the remote controller.

The control unit 60 adjusts the opening degree of the electronic expansion valve, which is an example of the expansion mechanism 25, so that a degree of superheating SHr of refrigerant at a gas-side outlet of the use-side heat exchanger 52 becomes a predetermined target degree of superheating SHrs. The degree of superheating SHr of refrigerant at the gas-side outlet of the use-side heat exchanger 52 is calculated by, for example, subtracting a measurement value of the liquid-side temperature sensor 54 (evaporation temperature Te) from a measurement value of the gas-side temperature sensor 55. The degree of superheating SHr may be calculated on the basis of a measurement value of another sensor.

The control unit 60 controls an operating capacity of the compressor 21 so that the evaporation temperature Te corresponding to a measurement value of the suction pressure sensor 31 (suction pressure Ps) approaches a target evaporation temperature Tes determined by a difference between the space temperature Tr measured by the space temperature sensor 56 and the set temperature Trs. Control of the operating capacity of the compressor 21 is performed by controlling the number of rotations of the motor 21a.

When the operations of the devices of the air conditioning apparatus 100 are controlled in the above-described manner during the cooling operation, refrigerant flows in the refrigerant circuit 10 in the following manner.

In response to activation of the compressor 21, low-pressure gas refrigerant in a refrigeration cycle is sucked into the compressor 21, is compressed by the compressor 21, and becomes high-pressure gas refrigerant in the refrigeration cycle. The high-pressure gas refrigerant is supplied to the heat-source-side heat exchanger 23 via the flow direction switching mechanism 22, exchanges heat with heat source air supplied by the heat-source-side fan 28 to condense, and becomes high-pressure liquid refrigerant. The high-pressure liquid refrigerant flows through the liquid-refrigerant pipe 12d, is decompressed to be close to the suction pressure of the compressor 21 by the expansion mechanism 25, becomes refrigerant in a gas-liquid two-phase state, and is supplied to the use unit 50. The refrigerant in the gas-liquid two-phase state supplied to the use unit 50 exchanges, in the use-side heat exchanger 52, heat with air in an air conditioning target space supplied by the use-side fan 53 to the use-side heat exchanger 52, evaporates, and becomes low-pressure gas refrigerant. The low-pressure gas refrigerant is supplied to the heat source unit 20 via the gas-refrigerant connection pipe 4 and flows into the accumulator 24 via the flow direction switching mechanism 22. The low-pressure gas refrigerant that has flowed into the accumulator 24 is sucked again into the compressor 21. On the other hand, the temperature of the air supplied to the use-side heat exchanger 52 decreases as a result of the heat exchange between the air and the refrigerant flowing in the use-side heat exchanger 52. The air cooled by the use-side heat exchanger 52 blows into the air conditioning target space.

(2-5-2) Operation During Heating Operation

In response to an instruction to execute a heating operation provided to the air conditioning apparatus 100, the control unit 60 sets the operation mode of the air conditioning apparatus 100 to the heating operation mode. The control unit 60 controls the flow direction switching mechanism 22 to the state indicated by the broken lines in FIG. 2 so that the refrigerant circuit 10 enters the above-described second state, and operates the compressor 21, the heat-source-side fan 28, and the use-side fan 53.

During the heating operation, the control unit 60 controls the devices of the air conditioning apparatus 100 in the following manner, for example. The control of the operation of the air conditioning apparatus 100 during the heating operation described here is merely an example, and does not limit the method of controlling the air conditioning apparatus 100 by the control unit 60 during the heating operation. For example, the control unit 60 may control operations of various devices on the basis of variables other than those described here.

The control unit 60 controls each of the number of rotations of the motor 28a that drives the heat-source-side fan 28 and the number of rotations of the motor 53a that drives the use-side fan 53 to a predetermined number of rotations. The control unit 60 controls, for example, the number of rotations of the motor 28a to a maximum number of rotations. The control unit 60 controls the number of rotations of the motor 53a as appropriate on the basis of an instruction or the like about an air volume input to the remote controller.

The control unit 60 adjusts the opening degree of the electronic expansion valve, which is an example of the expansion mechanism 25, so that a degree of subcooling SCr of refrigerant at a liquid-side outlet of the use-side heat exchanger 52 becomes a predetermined target degree of subcooling SCrs. The degree of subcooling SCr of refrigerant at the liquid-side outlet of the use-side heat exchanger 52 is calculated by, for example, subtracting a measurement value of the liquid-side temperature sensor 54 from a condensation temperature Tc calculated based on a measurement value of the discharge pressure sensor 30 (discharge pressure Pd).

The control unit 60 controls an operating capacity of the compressor 21 so that the condensation temperature Tc corresponding to the measurement value of the discharge pressure sensor 30 (discharge pressure Pd) approaches a target condensation temperature Tcs determined by a difference between the space temperature Tr measured by the space temperature sensor 56 and the set temperature Trs. Control of the operating capacity of the compressor 21 is performed by controlling the number of rotations of the motor 21*a*.

When the operations of the devices of the air conditioning apparatus 100 are controlled in the above-described manner during the heating operation, refrigerant flows in the refrigerant circuit 10 in the following manner.

In response to activation of the compressor 21, low-pressure gas refrigerant in a refrigeration cycle is sucked into the compressor 21, is compressed by the compressor 21, and becomes high-pressure gas refrigerant in the refrigeration cycle. The high-pressure gas refrigerant is supplied to the use-side heat exchanger 52 via the flow direction switching mechanism 22, exchanges heat with air in an air conditioning target space supplied by the use-side fan 53 to condense, and becomes high-pressure liquid refrigerant. The temperature of the air supplied to the use-side heat exchanger 52 increases as a result of the heat exchange between the air and the refrigerant flowing in the use-side heat exchanger 52. The air heated by the use-side heat exchanger 52 blows into the air conditioning target space. The high-pressure liquid refrigerant flowing out of the use-side heat exchanger 52 is supplied to the heat source unit 20 via the liquid-refrigerant connection pipe 2 and flows into the liquid-refrigerant pipe 12*d*. The refrigerant flowing through the liquid-refrigerant pipe 12*d* is decompressed to be close to the suction pressure of the compressor 21 when passing through the expansion mechanism 25, becomes refrigerant in a gas-liquid two-phase state, and flows into the heat-source-side heat exchanger 23. The low-pressure refrigerant in a gas-liquid two-phase state that has flowed into the heat-source-side heat exchanger 23 exchanges heat with heat source air supplied by the heat-source-side fan 28, evaporates to become a low-pressure gas refrigerant, and flows into the accumulator 24 via the flow direction switching mechanism 22. The low-pressure gas refrigerant that has flowed into the accumulator 24 is sucked again into the compressor 21.

When the operation mode of the air conditioning apparatus 100 is the heating operation mode, the control unit 60 temporarily suspends the heating operation and temporarily switches the state of the refrigerant circuit 10 to the first state, thereby performing a so-called reverse-cycle defrosting operation. A defrosting operation is generally known and thus the detailed description thereof is omitted here.

(3) Performance Degradation Diagnosis System

Next, the performance degradation diagnosis system 200 that diagnoses performance degradation of the air conditioning apparatus 100 will be described with reference to FIG. 1.

The performance degradation diagnosis system 200 mainly includes the diagnosis apparatus 210. In the present embodiment, the diagnosis apparatus 210 is a computer. The diagnosis apparatus 210 may be constituted by a single computer or may be constituted by a plurality of computers connected so as to be capable of communicating with each other. The configuration of the diagnosis apparatus 210 described here is merely an example. The functions of the diagnosis apparatus 210 described below may be implemented by any of software, hardware, and a combination of software and hardware.

In the present embodiment, the diagnosis apparatus 210 is an independent apparatus that is disposed in a site in which the air conditioning apparatus 100 is installed and that is separated from the air conditioning apparatus 100. The diagnosis apparatus 210 is not limited thereto, and may be mounted in the air conditioning apparatus 100. For example, the above-described control unit 60 may have a function similar to that of the diagnosis apparatus 210. The diagnosis apparatus 210 may be installed in a place other than the site in which the air conditioning apparatus 100 is installed and may be connected to the air conditioning apparatus 100 so as to be capable of communicating therewith. For example, the performance degradation diagnosis system 200 may provide functions described below via a network such as the Internet in the form of cloud computing.

The diagnosis apparatus 210 need not be an apparatus that performs only evaluation of the single air conditioning apparatus 100. The diagnosis apparatus 210 may perform a performance degradation diagnosis also on another air conditioning apparatus in the building in which the air conditioning apparatus 100 is installed or on an air conditioning apparatus installed in a place other than the building in which the air conditioning apparatus 100 is installed.

The diagnosis apparatus 210 is connected to the control unit 60 of the air conditioning apparatus 100 so as to be capable of communicating therewith. The diagnosis apparatus 210 and the control unit 60 may be connected by a physical communication line or wirelessly so as to be capable of communicating with each other.

The diagnosis apparatus 210 is capable of transmitting, to the control unit 60, a signal of providing an instruction to operate the air conditioning apparatus 100. The signal of providing an instruction to operate the air conditioning apparatus 100 includes signals of providing instructions to operate various devices of the air conditioning apparatus 100. The signals of providing instructions to operate various devices of the air conditioning apparatus 100 include at least one of a signal of specifying the number of rotations of the motor 21*a* of the compressor 21, a signal of specifying the number of rotations of the motor 28*a* of the heat-source-side fan 28, a signal of specifying the number of rotations of the motor 53*a* of the use-side fan 53, and a signal of specifying the opening degree of the electronic expansion valve serving as the expansion mechanism 25. The signal of providing an instruction to operate the air conditioning apparatus 100 may include a signal of providing an instruction to activate the air conditioning apparatus 100 and a signal of providing an instruction to deactivate the air conditioning apparatus 100. The diagnosis apparatus 210 is capable of receiving, as an index indicating an operation state of the air conditioning apparatus 100, measurement data of various sensors of the air conditioning apparatus 100 or data indicating an operation state from the control unit 60. The diagnosis apparatus 210 may transmit information about a setting of the air conditioning apparatus 100 (a set temperature or the like) to the control unit 60 via the communication line.

The diagnosis apparatus 210 functions mainly as an acquiring unit 212, an air-conditioning control unit 214, a determining unit 216, and an overall determining unit 218 (see FIG. 1) as a result of a CPU of the computer executing a program stored in a memory. The diagnosis apparatus 210 includes a storage unit 220 that stores the program executed by the CPU and various pieces of data including data received from the control unit 60 of the air conditioning apparatus 100. Hereinafter, the functions of the acquiring unit 212, the air-conditioning control unit 214, the determining unit 216, and the overall determining unit 218 will be described.

(3-1) Acquiring Unit

The acquiring unit 212 acquires measurement values of the sensors 30 to 36 and 54 to 57 transmitted from the control unit 60 of the air conditioning apparatus 100 via the communication line, and stores the measurement values in the storage unit 220. The acquiring unit 212 also acquires the number of rotations of the motor 21a of the compressor 21, the number of rotations of the motor 28a of the heat-source-side fan 28, and the number of rotations of the motor 53a of the use-side fan 53 transmitted from the control unit 60 of the air conditioning apparatus 100 via the communication line, and stores the numbers of rotations in the storage unit 220. The information received by the acquiring unit 212 from the control unit 60 is not limited to the measurement values of the sensors 30 to 36 and 54 to 57, and the numbers of rotations of the motors 21a, 28a, and 53a. For example, the acquiring unit 212 may acquire, from the control unit 60, a calculation value calculated by the control unit 60 in addition to some or all of the measurement values of the sensors 30 to 36 and 54 to 57 and the numbers of rotations of the motors 21a, 28a, and 53a or instead of these pieces of data. The calculation value herein is a value calculated by the control unit 60 by using at least one of the measurement values of the sensors 30 to 36 and 54 to 57 and the numbers of rotations of the motors 21a, 28a, and 53a. For example, the acquiring unit 212 may acquire, as a calculation value calculated by the control unit 60, a value of a refrigerant circulation amount G described later.

Here, the acquiring unit 212 acquires the measurement values or the like of the sensors 30 to 36 and 54 to 57 from the control unit 60. Alternatively, the acquiring unit 212 may acquire data from a device other than the control unit 60. For example, the acquiring unit 212 may acquire measurement values directly from the sensors 30 to 36 and 54 to 57.

(3-2) Air-Conditioning Control Unit

When the determining unit 216 determines performance degradation of the air conditioning apparatus 100 with respect to each of a plurality of performance degradation factors, the air-conditioning control unit 214 transmits a signal of providing an instruction to operate the air conditioning apparatus 100 to the air conditioning apparatus 100 and controls an operation condition of the air conditioning apparatus 100 to an appropriate operation condition suitable for determining performance degradation of the air conditioning apparatus 100 resulting from a performance degradation factor of a determination target.

In particular, preferably, in a case where the operation condition of the air conditioning apparatus 100 which is operating is an operation condition in which the determining unit 216 is incapable of determining performance degradation of the air conditioning apparatus 100 with respect to the performance degradation factor of the determination target, the air-conditioning control unit 214 controls the operation condition of the air conditioning apparatus 100 to the appropriate operation condition.

The details of control of the operation condition of the air conditioning apparatus 100 performed by the air-conditioning control unit 214 will be described later.

(3-3) Determining Unit

The determining unit 216 is a functional unit that determines performance degradation of the air conditioning apparatus 100 with respect to each of a plurality of performance degradation factors on the basis of an index indicating an operation state of the air conditioning apparatus 100 acquired while the air conditioning apparatus 100 is operating.

The determining unit 216 determines performance degradation of the air conditioning apparatus 100 on the basis of an index indicating an operation state of the air conditioning apparatus 100 acquired in a state in which the air-conditioning control unit 214 controls an operation condition of the air conditioning apparatus 100 to an operation condition suitable for each of performance degradation factors. Thus, the determining unit 216 normally determines performance degradation of the air conditioning apparatus 100 with respect to each of a plurality of performance degradation factors on the basis of an index indicating an operation state of the air conditioning apparatus 100 that is controlled in different operation conditions each other. In other words, the determining unit 216 normally determines performance degradation of the air conditioning apparatus 100 on the basis of indices indicating operation states of the air conditioning apparatus 100 acquired at different timings. However, in a case where an operation condition of the air conditioning apparatus 100 suitable for diagnosis related to a certain performance degradation factor is the same as an operation condition suitable for diagnosis related to another performance degradation factor, the determining unit 216 may determine performance degradation of the air conditioning apparatus 100 with respect to two or more performance degradation factors on the basis of indices indicating operation states of the air conditioning apparatus 100 acquired under the same operation condition (at the same timing).

For example, in a case where the overall determining unit 218 described below determines that the air conditioning apparatus 100 has performance degradation, the determining unit 216 determines performance degradation of the air conditioning apparatus 100 with respect to each of a plurality of performance degradation factors. The determining unit 216 may determine performance degradation of the air conditioning apparatus 100 in accordance with, for example, an input of an instruction from a manager or the like of the air conditioning apparatus 100 to an input unit that is not illustrated. The determining unit 216 may periodically determine performance degradation of the air conditioning apparatus 100, for example.

Preferably, in response to the determining unit 216 determining that the air conditioning apparatus 100 has performance degradation regarding a certain performance degradation factor, for example, the diagnosis apparatus 210 causes a display 222 of the diagnosis apparatus 210 to display a fact that there is performance degradation together with that performance degradation factor. In response to the determining unit 216 determining that the air conditioning apparatus 100 has performance degradation regarding a certain performance degradation factor, the diagnosis apparatus 210 may report that there is performance degradation and may report that performance degradation factor, to a mobile terminal or the like carried by a manager or the like of the air conditioning apparatus 100.

Here, an index indicating an operation state of the air conditioning apparatus 100 includes at least one of: at least one measurement value of the sensors 30 to 36 and 54 to 57 provided in the air conditioning apparatus 100; the numbers of rotations of the motors 21a, 28a, and 53a of the air conditioning apparatus 100; and a value calculated by using at least one of these pieces of data. Performance degradation of the air conditioning apparatus 100 means a decrease in performance relative to the performance of the air conditioning apparatus 100 at the time of installation or after maintenance.

The determining unit 216 diagnoses performance degradation of the air conditioning apparatus 100 with respect to each of three performance degradation factors: a decrease in the amount of refrigerant sealed in the refrigerant circuit 10; soiling of the heat-source-side heat exchanger 23; and soiling of at least one of the use-side heat exchanger 52 and the filter 58 (hereinafter, to avoid complexity of description, "soiling of at least one of the use-side heat exchanger 52 and the filter 58" may be referred to as "soiling of the use-side heat exchanger 52 or the like"). In other words, the determining unit 216 individually determines whether there is performance degradation due to a decrease in the amount of refrigerant, whether there is performance degradation due to a decrease in soiling of the heat-source-side heat exchanger 23, and whether there is performance degradation due to soiling of the use-side heat exchanger 52 or the like. Thus, the determining unit 216 determines not only whether there is performance degradation but also a cause of the performance degradation.

Performance degradation due to soiling of the heat exchanger 23 or 52 means a state in which, due to dust or the like adhered to the heat exchanger 23 or 52, an airflow path of the heat exchanger 23 or 52 (for example, some gaps between fins of the heat exchanger 23 or 52) is clogged or narrowed and thus air supplied by the fan 28 or 53 has difficulty in passing through the heat exchanger 23 or 52. Performance degradation due to soiling of the filter 58 means a state in which, due to dust or the like adhered to the filter 58, air supplied by the fan 53 has difficulty in passing through the filter 58.

Figure 3:
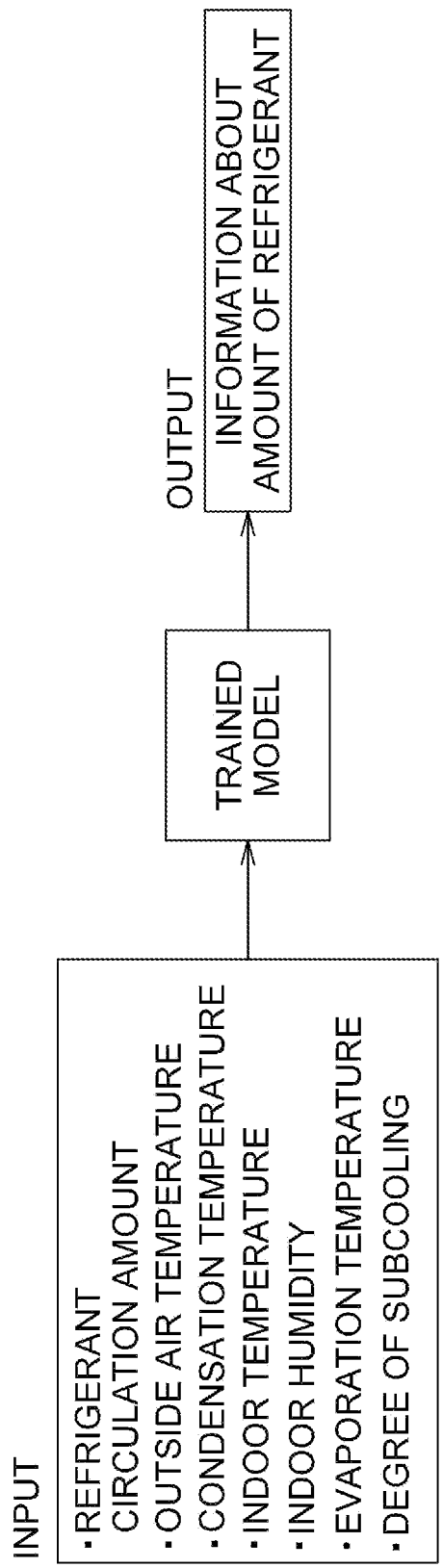
FIG. 3 is a diagram schematically illustrating a configuration in which a determining unit of a diagnosis apparatus of the performance degradation diagnosis system calculates information about the amount of refrigerant.

In brief, in the present embodiment, the determining unit 216 inputs various indices indicating an operation state of the air conditioning apparatus 100 to a trained model trained by a training unit not illustrated of the diagnosis apparatus 210 by using a method of machine learning, and acquires information about the amount of refrigerant as an output (see FIG. 3). Subsequently, the determining unit 216 determines a decrease in the amount of refrigerant on the basis of the acquired information about the amount of refrigerant. The information about the amount of refrigerant herein is, for example, information indicating whether the amount of refrigerant sealed in the refrigerant circuit 10 is larger than or equal to a reference amount or is smaller than the reference amount. For example, the reference value is an appropriate amount of refrigerant sealed in the refrigerant circuit 10. The training unit that is not illustrated performs learning by using, as a method of machine learning, a method of supervised learning or reinforcement learning.

In the present embodiment, the determining unit 216 calculates the abilities of the heat-source-side heat exchanger 23 and the use-side heat exchanger 52 by using a mathematical expression on the basis of various indices indicating an operation state of the air conditioning apparatus 100. The determining unit 216 determines soiling of heat-source-side heat exchanger 23 and soiling of the use-side heat exchanger 52 or the like on the basis of the acquired abilities of the heat-source-side heat exchanger 23 and the use-side heat exchanger 52. Hereinafter, details will be described.

<Determination of Performance Degradation of Air Conditioning Apparatus in which Decrease in the Amount of Refrigerant is Performance Degradation Factor>

Here, a description will be given of, as an example, a case where supervised learning is used as the above-described machine learning.

Supervised learning is a method of generating an output corresponding to unknown input data by using teacher data. Supervised learning uses learning data and a discriminant function. The learning data is a set of pairs each formed of input data and teacher data (correct) corresponding thereto. Typically, the input data is, for example, a feature vector in a feature space. The teacher data is, for example, variables related to discrimination, classification, and evaluation of the input data. The discriminant function represents a mapping from input data to an output corresponding thereto. Supervised learning is a method of adjusting, with use of learning data given in advance, variables of a discriminant function so as to reduce an error between an output of the discriminant function and teacher data. Models or algorithms used in supervised learning include a regression analysis, a time-series analysis, a decision tree, a support vector machine, a neural network, ensemble learning, and the like.

The regression analysis is, for example, a linear regression analysis, a multiple regression analysis, or a logistic regression analysis. The regression analysis is a method of applying a model between input data (explanatory variable) and teacher data (response variable) by using the least squares method or the like. The dimension of the explanatory variable is one in the linear regression analysis and is two or more in the multiple regression analysis. In the logistic regression analysis, a logistic function (sigmoid function) is used as a model.

The time-series analysis is, for example, an autoregressive (AR) model, a moving average (MA) model, an autoregressive moving average (ARMA) model, an autoregressive integrated moving average (ARIMA) model, a seasonal autoregressive integrated moving average (SARIMA) model, or a vector autoregressive (VAR) model. The AR, MA, ARMA, and VAR models represent a stationary process, whereas the ARIMA and SARIMA models represent a non-stationary process. The AR model is a model in which a value regularly changes as time elapses. The MA model is a model in which a variation in a certain period is constant. For example, in the MA model, a value at a certain time point is determined by a moving average before the time point. The ARMA model is a combination of the AR model and the MA model. The ARIMA model is a model in which the ARMA model is applied to a difference between a preceding value and a subsequent value in consideration of a medium-to-long term trend (trend of increase or decrease). The SARIMA model is a model in which the ARIMA model is applied in consideration of a medium-to-long term seasonal variation. The VAR model is a model in which the AR model is expanded in a multivariate manner.

The decision tree is a model for generating complex decision boundaries by combining a plurality of classifiers.

The support vector machine is an algorithm of generating a two-class linear discriminant function.

The neural network is obtained by modeling a network formed by connecting neurons of a human cranial nerve system by synapses. The neural network means, in a narrow sense, a multilayer perceptron using backpropagation. Typical neural networks are a convolutional neural network (CNN) and a recurrent neural network (RNN). The CNN is a kind of feedforward neural network that is not fully connected (loosely connected). The RNN is a kind of neural network having a directed cycle. The CNN and the RNN are used for audio/image/video recognition and natural language processing.

Ensemble learning is a method of enhancing classification performance by combining a plurality of models. Methods used in ensemble learning are, for example, bagging, boosting, and a random forest. Bagging is a method of training a plurality of models by using bootstrap samples of learning data and deciding evaluation of newly input data by a majority vote of the plurality of models. Boosting is a method of weighting learning data in accordance with a learning result of bagging so that misclassified learning data is learned more intensively than correctly classified learning data. The random forest is a method of generating a decision tree group (random forest) composed of a plurality of decision trees having a low correlation in a case where the decision tree is used as a model.

For example, in a case where any one of the above-described supervised learning methods is used to train a model of information about the amount of refrigerant, the training unit trains a model by using the following learning data.

For example, the training unit trains a model about a decrease in the amount of refrigerant by using learning data in which a refrigerant circulation amount G, an outside air temperature (temperature of heat source air), a condensation temperature Tc, an indoor temperature (space temperature Tr), an indoor humidity (space humidity Hr), an evaporation temperature Te, and a degree of subcooling SC as indices indicating an operation state of the air conditioning apparatus are input values and in which information about the amount of refrigerant sealed in the refrigerant circuit 10 is an output value. The refrigerant circulation amount G is calculated by using a function in which a discharge pressure Pd, a suction pressure Ps, a suction temperature Ts, and the number of rotations N of the motor 21a of the compressor 21 are variables. The function for calculating the refrigerant circulation amount G is a function unique to the compressor 21. The input values of learning data need not include all of the above-described input values. For example, an indoor humidity need not be included in the input values. The information about the amount of refrigerant sealed in the refrigerant circuit 10 is, for example, information indicating whether the amount of refrigerant sealed in the refrigerant circuit 10 is larger than or equal to a reference amount or is smaller than the reference amount. For example, the reference value is an appropriate amount of refrigerant sealed in the refrigerant circuit 10.

The learning data includes, for example, many pieces of data obtained by causing a test apparatus of an air conditioning apparatus to perform a cooling operation while changing the amount of refrigerant, and by associating the refrigerant circulation amount G, outside air temperature, condensation temperature, indoor temperature, indoor humidity, evaporation temperature, and degree of subcooling acquired at the time with the amount of refrigerant during the operation. Hereinafter, to avoid complexity of description, a refrigerant circulation amount, an outside air temperature, a condensation temperature, an indoor temperature, an indoor humidity, an evaporation temperature, and a degree of subcooling may be collectively referred to as refrigerant-amount-diagnosis input values. Alternatively, the learning data may be many pieces of data obtained by associating refrigerant-amount-diagnosis input values acquired when the air conditioning apparatus 100 performs a cooling operation while changing the amount of refrigerant during a test operation at the time of installation of the air conditioning apparatus 100, with the amount of refrigerant during the operation. Alternatively, the learning data may be data obtained by associating refrigerant-amount-diagnosis input values acquired at the time of an actual cooling operation of the air conditioning apparatus 100 or a similar apparatus with the amount of refrigerant during the operation (whether the amount of refrigerant is an appropriate amount or smaller than the appropriate amount). The training unit may collect learning data while the air conditioning apparatus 100 is actually operating and may retrain the trained model by using the learning data.

At the timing of determining performance degradation of the air conditioning apparatus 100 in which a decrease in the amount of refrigerant is a performance degradation factor, the determining unit 216 derives a refrigerant circulation amount G, an outside air temperature, a condensation temperature, an indoor temperature, an indoor humidity, an evaporation temperature, and a degree of subcooling SC, which are input values for the trained model, on the basis of data acquired by the acquiring unit 212 from the control unit 60 of the air conditioning apparatus 100 which is performing a cooling operation. The refrigerant circulation amount G, the outside air temperature, the condensation temperature, the indoor temperature, the indoor humidity, the evaporation temperature, and the degree of subcooling SC may be data transmitted by the control unit 60 or may be values calculated by the diagnosis apparatus 210 on the basis of data acquired by the acquiring unit 212. The determining unit 216 inputs these input values to the trained model and acquires information about the amount of refrigerant as an output. In other words, the determining unit 216 inputs these input values to the trained model and determines whether the amount of refrigerant sealed in the refrigerant circuit 10 is smaller than the reference amount. If the determining unit 216 determines that the amount of refrigerant is smaller than the reference amount, the determining unit 216 determines that the air conditioning apparatus 100 has performance degradation due to a decrease in the amount of refrigerant. The operation condition of the air conditioning apparatus 100 under which the input values used by the determining unit 216 are acquired will be described below.

Here, a description is given of, as an example, a case where the determining unit 216 determines performance degradation of the air conditioning apparatus 100 due to a decrease in the amount of refrigerant by using a trained model based on machine learning. However, the determining unit 216 may determine performance degradation of the air conditioning apparatus 100 without using a trained model based on machine learning. For example, the determining unit 216 may calculate the amount of refrigerant by using a mathematical expression or table of the amount of refrigerant in which a refrigerant circulation amount G, an outside air temperature, a condensation temperature, an indoor temperature, an indoor humidity, an evaporation temperature, and a degree of subcooling SC obtained on the basis of an experiment or simulation are variables, and may compare the amount of refrigerant with the reference amount to determine whether the amount of refrigerant is larger than or equal to the reference amount.

<Determination of Performance Degradation of Air Conditioning Apparatus in which Soiling of Heat-Source-Side Heat Exchanger is Performance Degradation Factor>

At the timing of determining performance degradation of the air conditioning apparatus 100 in which soiling of the heat-source-side heat exchanger 23 is a performance degradation factor, the determining unit 216 acquires a heatsource-side temperature difference and a heat-source-side heat exchange amount Q1 as indices indicating an operation state of the air conditioning apparatus 100 on the basis of data acquired by the acquiring unit 212 from the control unit 60 of the air conditioning apparatus 100 which is performing a cooling operation.

For example, the acquiring unit 212 acquires, from the control unit 60 of the air conditioning apparatus 100, a discharge pressure Pd, a suction pressure Ps, a suction temperature Ts, a discharge temperature Td, a measurement value of the heat exchange temperature sensor 34, a measurement value of the liquid-side temperature sensor 35, an outdoor temperature (temperature of heat source air), and the number of rotations N of the motor 21a of the compressor 21. Subsequently, the determining unit 216 acquires, as an index indicating an operation state of the air conditioning apparatus 100, the heat-source-side temperature difference obtained by subtracting the outdoor temperature from the condensation temperature (for example, the measurement value of the heat exchange temperature sensor 34). In addition, the determining unit 216 acquires, as an index indicating an operation state of the air conditioning apparatus 100, the heat-source-side heat exchange amount Q1 calculated by using the following expression.

$$Q1 = G \times \Delta hc = f(Pd, Ps, Ts, N) \times (hc_{in} - hc_{out}) \quad \text{(Expression 1)}$$

Here, G represents the amount of refrigerant circulating in the refrigerant circuit 10, and $\Delta hc$ represents the difference between an inlet-side enthalpy $hc_{in}$ of the heat-source-side heat exchanger 23 and an outlet-side enthalpy $hc_{out}$ of the heat-source-side heat exchanger 23. The inlet-side enthalpy $hc_{in}$ is calculated on the basis of a characteristic of refrigerant and a temperature and pressure at the inlet side of the heat-source-side heat exchanger 23. The outlet-side enthalpy $hc_{out}$ is calculated on the basis of a characteristic of refrigerant and a temperature and pressure at the outlet side of the heat-source-side heat exchanger 23. The function f(Pd, Ps, Ts, N) is an expression based on a characteristic or the like of the compressor 21 and is an expression for calculating the refrigerant circulation amount G by using the discharge pressure Pd, the suction pressure Ps, the suction temperature Ts, and the number of rotations N of the motor 21a as variables.

The determining unit 216 of the diagnosis apparatus 210 evaluates soiling on the heat source side of the air conditioning apparatus 100 on the basis of a first heat exchange temperature difference and the heat-source-side heat exchange amount Q1 serving as indices indicating an operation state of the air conditioning apparatus 100. In a case where the heat-source-side heat exchange amount Q1 is small relative to the first heat exchange temperature difference, the determining unit 216 determines that soiling has occurred in the heat-source-side heat exchanger 23 and that the air conditioning apparatus 100 has performance degradation. For example, in a case where the heat-source-side heat exchange amount Q1 is smaller than a reference value that is determined for each of values of the first heat exchange temperature difference, the determining unit 216 determines that soiling has occurred in the heat-source-side heat exchanger 23 and that the air conditioning apparatus 100 has performance degradation. The reference value is calculated on the basis of, for example, the heat-source-side heat exchange amount Q1 for each of values of the first heat exchange temperature difference calculated by using data in a state where no soiling has occurred in the heat-source-side heat exchanger 23, for example, data at the time of a cooling operation performed in an initial test run.

<Determination of Performance Degradation of Air Conditioning Apparatus in which Soiling of Use-Side Heat Exchanger or the Like is Performance Degradation Factor>

At the timing of determining performance degradation of the air conditioning apparatus 100 in which soiling of the use-side heat exchanger 52 or the like is a performance degradation factor, the determining unit 216 acquires a use-side temperature difference and a use-side heat exchange amount Q2 as indices indicating an operation state of the air conditioning apparatus 100 on the basis of data acquired by the acquiring unit 212 from the control unit 60 of the air conditioning apparatus 100 which is performing a cooling operation.

For example, the acquiring unit 212 acquires, from the control unit 60 of the air conditioning apparatus 100, a discharge pressure Pd, a suction pressure Ps, a suction temperature Ts, a measurement value of the liquid-side temperature sensor 54, a measurement value of the gas-side temperature sensor 55, an indoor temperature (space temperature Tr), and the number of rotations N of the motor 21a of the compressor 21 as information. Subsequently, the determining unit 216 acquires, as an index indicating an operation state of the air conditioning apparatus 100, a second heat exchange temperature difference obtained by subtracting an evaporation temperature (for example, an evaporation temperature Te calculated from the suction pressure Ps) from the indoor temperature. In addition, the determining unit 216 acquires, as an index indicating an operation state of the air conditioning apparatus 100, the use-side heat exchange amount Q2 calculated by using the following expression.

$$Q2 = G \times \Delta he = f(Pd, Ps, Ts, N) \times (he_{out} - he_{in}) \quad \text{(Expression 2)}$$

Here, G represents the amount of refrigerant circulating in the refrigerant circuit 10, and $\Delta he$ represents the difference between an outlet-side enthalpy $he_{out}$ of the use-side heat exchanger 52 and an inlet-side enthalpy $he_{in}$ of the use-side heat exchanger 52. The outlet-side enthalpy $he_{out}$ is calculated on the basis of a characteristic of refrigerant and a temperature and pressure at the outlet side of the use-side heat exchanger 52. The inlet-side enthalpy $he_{in}$ is calculated on the basis of a characteristic of refrigerant and a temperature and pressure at the inlet side of the use-side heat exchanger 52. The function f(Pd, Ps, Ts, N) is an expression based on a characteristic or the like of the compressor 21 and is an expression for calculating the refrigerant circulation amount G by using the discharge pressure Pd, the suction pressure Ps, the suction temperature Ts, and the number of rotations N of the motor 21a as variables.

The determining unit 216 of the diagnosis apparatus 210 evaluates soiling of the use-side heat exchanger 52 or the like on the basis of the second heat exchange temperature difference and the use-side heat exchange amount Q2 serving as indices indicating an operation state of the air conditioning apparatus 100. In a case where the use-side heat exchange amount Q2 is small relative to the second heat exchange temperature difference, the determining unit 216 determines that soiling has occurred in the use-side heat exchanger 52 and/or the filter 58 and that the air conditioning apparatus 100 has performance degradation. For example, in a case where the use unit-side heat exchange amount Q2 is smaller than a reference value that is determined for each of values of the second heat exchange temperature difference, the determining unit 216 determines that soiling has occurred in an air filter provided in the use-side heat exchanger 52 and/or the use unit 50 and that the air conditioning apparatus 100 has performance degradation. The reference value is calculated on the basis of, for example, the use-side heat exchange amount Q2 for each of values of the second heat exchange temperature difference calculated by using data in a state where no soiling has occurred in the heat-source-side heat exchanger 23, for example, data at the time of a cooling operation performed in an initial test run.

(3-4) Overall Determining Unit

The overall determining unit 218 determines overall performance degradation of the air conditioning apparatus 100. Here, overall performance degradation of the air conditioning apparatus 100 means a state in which the performance of the air conditioning apparatus 100 has been degraded for some reason (regardless of a reason).

Preferably, when the overall determining unit 218 diagnoses performance degradation, the air-conditioning control unit 214 does not instruct the control unit 60 to change an operation condition of the air conditioning apparatus 100, unlike in a case where the determining unit 216 diagnoses performance degradation with respect to each of a plurality of performance degradation factors. In other words, the overall determining unit 218 determines performance degradation of the air conditioning apparatus 100 on the basis of an index indicating an operation state of the air conditioning apparatus 100 when the air conditioning apparatus 100 performs normal operation.

For example, the overall determining unit 218 acquires an outside air temperature, an indoor temperature, and a set temperature acquired by the acquiring unit 212, and measures a time until the air conditioning apparatus 100 causes the set temperature to be reached from a predetermined indoor temperature. If the set temperature is not reached from the indoor temperature within a predetermined reference time, the overall determining unit 218 determines that the air conditioning apparatus 100 has performance degradation in consideration of an outside air temperature. The overall determining unit 218 may estimate the amount of power consumption until the air conditioning apparatus 100 causes the set temperature to be reached from the predetermined indoor temperature on the basis of information such as the number of rotations of the motor 21a of the compressor 21 acquired by the acquiring unit 212 from the control unit 60 of the air conditioning apparatus 100, for example, and may determine that the air conditioning apparatus 100 has performance degradation if the amount of power consumption exceeds a predetermined value.

In the case of determining that the air conditioning apparatus 100 has overall performance degradation, the overall determining unit 218 instructs the determining unit 216 to determine performance degradation of the air conditioning apparatus 100 with respect to each of a plurality of performance degradation factors to identify the cause of the performance degradation.

Figure 4A:
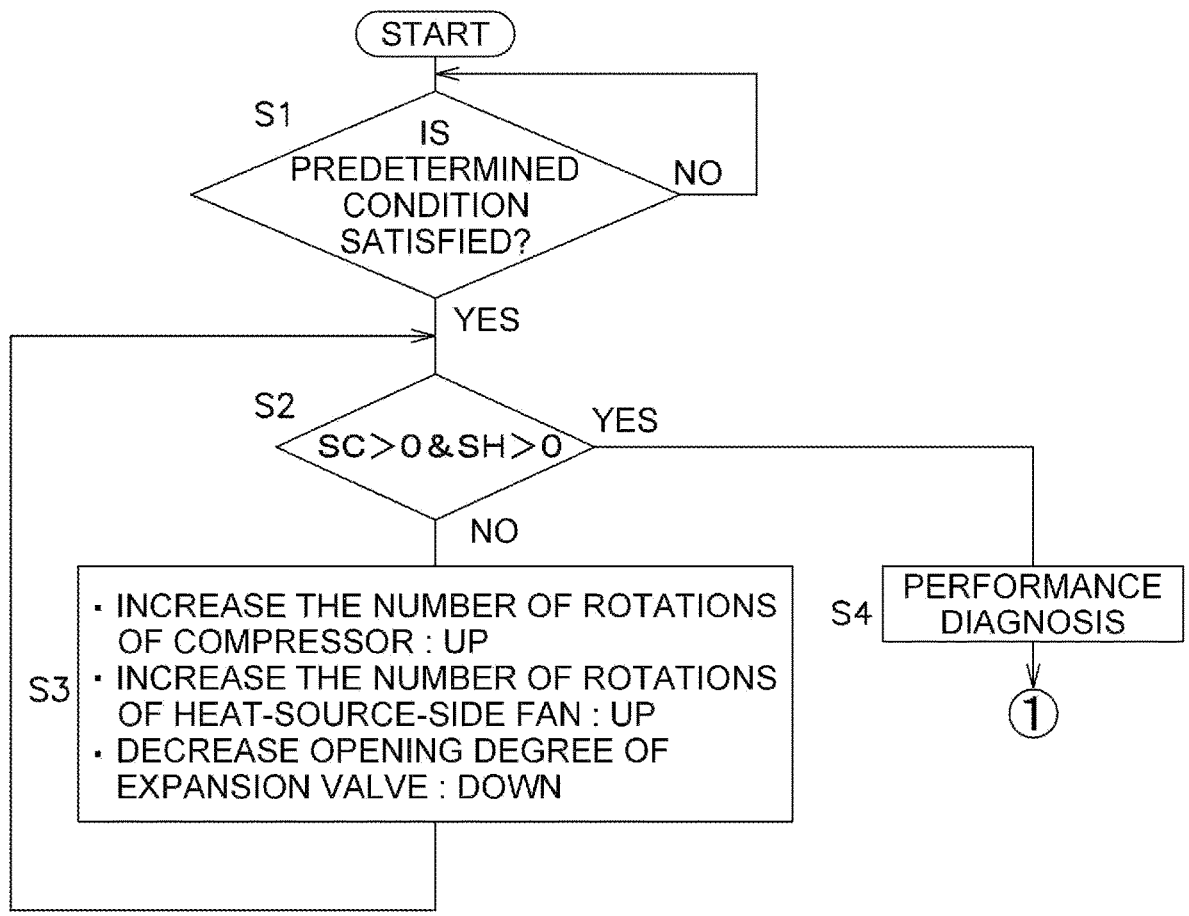
FIG. 4A illustrates an example of a flowchart showing a flow of a process of controlling an operation condition of the air conditioning apparatus performed by the performance degradation diagnosis system when the performance degradation diagnosis system diagnoses performance degradation of the air conditioning apparatus.
Figure 4B:
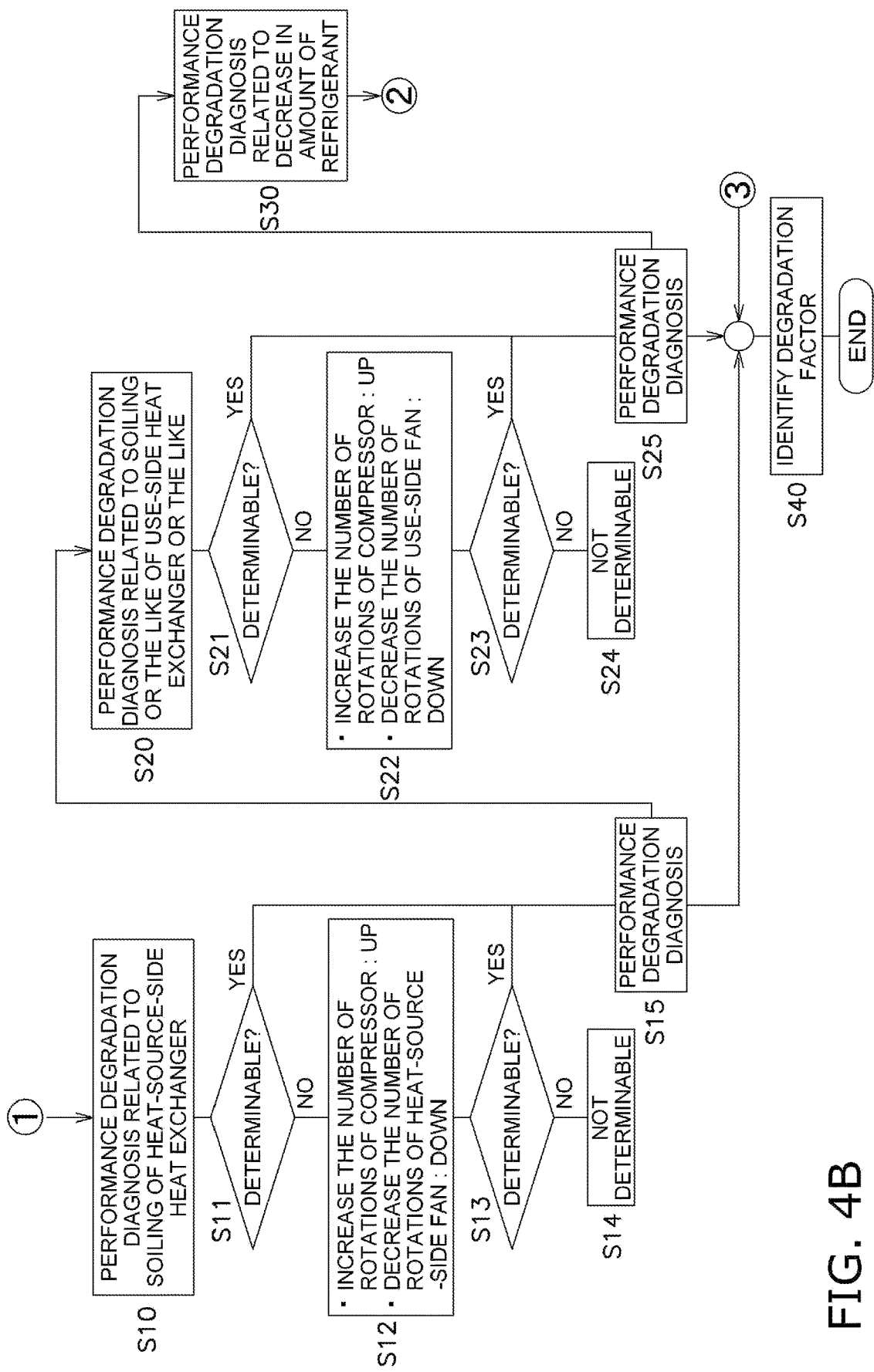
FIG. 4B illustrates an example of a flowchart showing a flow of a process of controlling an operation condition of the air conditioning apparatus performed by the performance degradation diagnosis system when the performance degradation diagnosis system diagnoses performance degradation of the air conditioning apparatus.
Figure 4C:
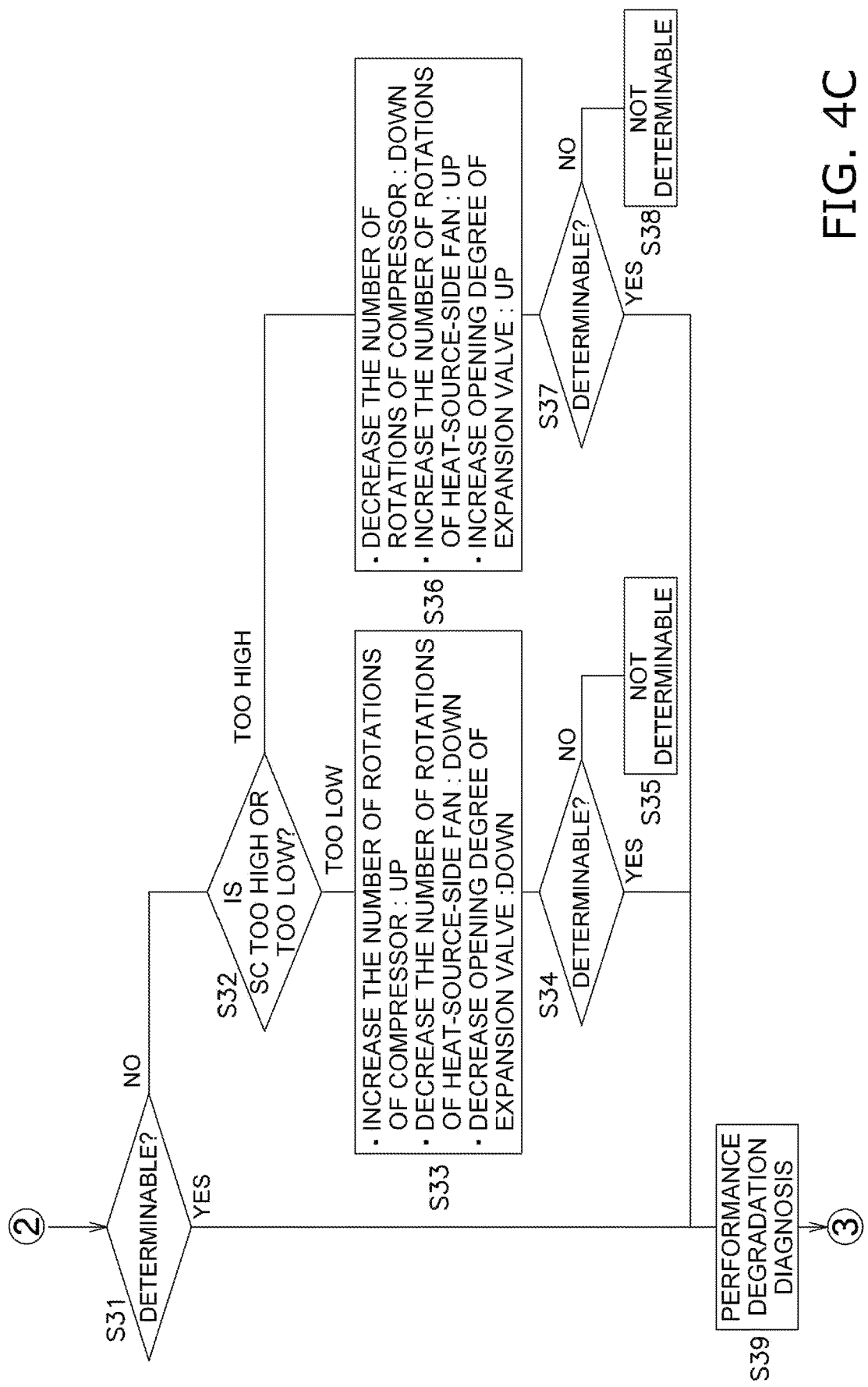
FIG. 4C illustrates an example of a flowchart showing a flow of a process of controlling an operation condition of the air conditioning apparatus performed by the performance degradation diagnosis system when the performance degradation diagnosis system diagnoses performance degradation of the air conditioning apparatus.

(4) Control of Operation Condition of Air Conditioning Apparatus for Performance Degradation Diagnosis As described above, when the determining unit 216 determines performance degradation of the air conditioning apparatus 100 with respect to each of performance degradation factors, the air-conditioning control unit 214 controls an operation condition of the air conditioning apparatus 100 to an appropriate operation condition suitable for determining performance degradation of the air conditioning apparatus 100 resulting from a performance degradation factor of a determination target. Control of an operation condition of the air conditioning apparatus 100 performed by the air-conditioning control unit 214 will be described with reference to the flowchart in FIG. 4A to FIG. 4C. FIG. 4A to FIG. 4C illustrate an example of a flowchart showing a procedure of a process of controlling an operation condition of the air conditioning apparatus 100 performed by the performance degradation diagnosis system 200 when the performance degradation diagnosis system 200 diagnoses performance degradation of the air conditioning apparatus 100. The control of an operation condition of the air conditioning apparatus 100 performed by the air-conditioning control unit 214 described here is an example, and may be changed as appropriate without causing inconsistency with the present disclosure. For example, one or some of the steps in the flowchart may be omitted without causing inconsistency with the present disclosure. For example, the order of the steps in the flowchart may be changed as appropriate without causing inconsistency with the present disclosure.

In the description given below, various pieces of information about the air conditioning apparatus 100 (the refrigerant circulation amount G, various temperatures, the degree of subcooling SC, the degree of superheating SH, the numbers of rotations of the motors 21a, 28a, and 53a, etc.) may be referred to. These pieces of information are information acquired by the acquiring unit 212 of the diagnosis apparatus 210 from the control unit 60 or information calculated by the diagnosis apparatus 210, based on information which the acquiring unit 212 acquired from the control unit 60. Hereinafter, to avoid complexity of description, a description about how the various pieces of information about the air conditioning apparatus 100 have been acquired will be omitted except for a case where such a description should be given.

The diagnosis apparatus 210 decides to diagnose performance degradation of the air conditioning apparatus 100 with respect to each of performance degradation factors, if the overall determining unit 218 determines that the air conditioning apparatus 100 has performance degradation, if an instruction to execute a performance degradation diagnosis is input to an input unit that is not illustrated, or at a predetermined time interval.

After deciding to diagnose performance degradation of the air conditioning apparatus 100 with respect to each of performance degradation factors, the diagnosis apparatus 210 starts a series of performance degradation diagnosis operations on the condition that a predetermined condition is satisfied (step S1). The predetermined condition herein includes that the air conditioning apparatus 100 is performing a cooling operation. The predetermined condition herein includes that each of an outside air temperature and an indoor temperature is within a predetermined temperature range. Here, a case where each of an outside air temperature and an indoor temperature is within the predetermined temperature range means that, for example, an outside air temperature and an indoor temperature are respectively within an outside air temperature range and an indoor temperature range included in learning data used to generate a trained model for determining a decrease in the amount of refrigerant. The predetermined condition used in step S1 may be changed as appropriate.

If it is determined in step S1 that the predetermined condition is satisfied, the air-conditioning control unit 214 determines whether both the degree of subcooling SC and the degree of superheating (the degree of suction superheating) SH are positive values. If at least one of the degree of subcooling SC and the degree of superheating SH is 0 or less, the process proceeds to step S3. Here, 0 is used as reference values of the degree of subcooling SC and the degree of superheating SH. Alternatively, a reference value α (α>0) other than 0 may be used as a reference value of the degree of subcooling, and a reference value β (β>0) other than 0 may be used as a reference value of the degree of superheating.

On the other hand, if both the degree of subcooling SC and the degree of superheating SH exceed 0, the process proceeds to step S4, where the diagnosis apparatus 210 starts diagnosing performance degradation of the air conditioning apparatus 100 with respect to each of a plurality of performance degradation factors.

In step S3, it is preferable that the air-conditioning control unit 214 change the operation condition of the air conditioning apparatus 100 so that the degree of superheating SH becomes a positive value. In step S3, it is preferable that the air-conditioning control unit 214 change the operation condition of the air conditioning apparatus 100 so that the degree of subcooling SC becomes a positive value.

Specifically, if the degree of subcooling SC in a refrigeration cycle has a value that is 0 or less, the air-conditioning control unit 214 instructs the control unit 60 of the air conditioning apparatus 100 to execute at least one of the following three operations a) to c) to control the operation condition of the air conditioning apparatus 100 to an appropriate operation condition.

a) Increase the number of rotations of the motor 21a of the compressor 21.
b) Increase the number of rotations of the motor 28a of the heat-source-side fan 28.
c) Decrease the opening degree of the expansion mechanism 25.

If the degree of superheating SH in a refrigeration cycle has a value that is 0 or less, the air-conditioning control unit 214 instructs the control unit 60 of the air conditioning apparatus 100 to execute at least one of the foregoing three operations a) to c) to control the operation condition of the air conditioning apparatus 100 to an appropriate operation condition.

A reason that it is preferable to control the degree of superheating SH in a refrigeration cycle to a value greater than 0 by the air-conditioning control unit 214 is that, when the degree of superheating SH is 0 or less and is in a humid condition, it is impossible to accurately calculate the refrigerant circulation amount G by using the above mathematical expression for the refrigerant circulation amount G.

A reason that it is preferable to control the degree of subcooling SC in a refrigeration cycle to a value greater than 0 by the air-conditioning control unit 214 is that, when the degree of subcooling SC is 0 or less, it is impossible to accurately calculate the amount of heat exchange of the heat-source-side heat exchanger 23 used by the determining unit 216 to determine performance degradation.

The operation of step S3 is repeatedly performed until both the degree of subcooling SC and the degree of superheating SH become positive values.

After the process proceeds to step S4, the determining unit 216 executes step S10, step S20, and step S30, which are diagnosis steps for performance degradation of the air conditioning apparatus 100 with respect to each performance degradation factor (see FIG. 4B). Here, the process proceeds to step S10 to diagnose performance degradation of the air conditioning apparatus 100 due to soiling of the heat-source-side heat exchanger 23. Subsequently, the process proceeds to step S20 to diagnose performance degradation of the air conditioning apparatus 100 due to soiling of the use-side heat exchanger 52 or the like. Subsequently, the process proceeds to step S30 to diagnose performance degradation of the air conditioning apparatus 100 due to a decrease in the amount of refrigerant. Note that the order of step S10, step S20, and step S30 is not specified and may be changed as appropriate.

After the process proceeds to step S10, the air-conditioning control unit 214 determines whether the operation condition of the air conditioning apparatus 100 which is operating is an operation condition in which the determining unit 216 is capable of determining performance degradation of the air conditioning apparatus 100 due to soiling of the heat-source-side heat exchanger 23 (step S11). Specifically, the air-conditioning control unit 214 determines whether a thermal load of the heat-source-side heat exchanger 23 is estimated to be greater than a predetermined value. For example, the air-conditioning control unit 214 calculates the difference between the inlet-side enthalpy $hc_{in}$ of the heat-source-side heat exchanger 23 and the outlet-side enthalpy $hc_{out}$ of the heat-source-side heat exchanger 23 described above, and determines, on the basis of whether the difference is greater than a predetermined value, whether the heat exchange load in the heat-source-side heat exchanger 23 is greater than the predetermined value. Alternatively, for example, the air-conditioning control unit 214 may determine that the heat exchange load in the heat-source-side heat exchanger 23 is greater than the predetermined value if the number of rotations of the motor 21a of the compressor 21 is larger than a predetermined value and/or if the number of rotations of the motor 28a of the heat-source-side fan 28 is smaller than a predetermined value. Such a determination is performed because it is difficult to diagnose performance degradation under a condition in which the load of the heat-source-side heat exchanger 23 is small.

If the determination in step S11 is Yes, the process proceeds to step S15, where the determining unit 216 diagnoses performance degradation of the air conditioning apparatus 100 due to soiling of the heat-source-side heat exchanger 23 on the basis of the first heat exchange temperature difference and the heat-source-side heat exchange amount Q1 serving as indices indicating an operation state of the air conditioning apparatus 100 as described above. After that, the process proceeds to step S20.

On the other hand, if the determination in step S11 is No, the process proceeds to step S12, where the air-conditioning control unit 214 causes the air conditioning apparatus 100 to execute at least one of an operation of increasing the number of rotations of the motor 21a of the compressor 21 and an operation of decreasing the number of rotations of the motor 28a of the heat-source-side fan 28, to control the operation condition of the air conditioning apparatus 100 which is operating to an appropriate operation condition.

After that, the process proceeds to step S13, where a determination is made similarly to step S11. If the determination in step S13 is Yes, the process proceeds to step S15. On the other hand, if the determination in step S13 is No, it is determined that performance diagnosis of the air conditioning apparatus 100 due to soiling of the heat-source-side heat exchanger 23 is not executable (step S14). After that, the performance diagnosis process may be suspended or the process may proceed to step S20.

After the process proceeds to step S20, the air-conditioning control unit 214 determines whether the operation condition of the air conditioning apparatus 100 which is operating is an operation condition in which the determining unit 216 is capable of determining performance degradation of the air conditioning apparatus 100 due to at least one of soiling of the use-side heat exchanger 52 and soiling of the filter 58 (step S21). Specifically, the air-conditioning control unit 214 determines whether a heat exchange load in the use-side heat exchanger 52 is estimated to be greater than a predetermined value. For example, the air-conditioning control unit 214 calculates the difference between the outlet-side enthalpy $he_{out}$ of the use-side heat exchanger 52 and the inlet-side enthalpy $he_{in}$ of the use-side heat exchanger 52 described above, and determines, on the basis of whether the difference is greater than a predetermined value, whether the heat exchange load in the use-side heat exchanger 52 is greater than the predetermined value. Alternatively, for example, the air-conditioning control unit 214 may determine that the thermal load in the use-side heat exchanger 52 is smaller than the predetermined value if the number of rotations of the motor 21*a* of the compressor 21 is larger than a predetermined value and/or if the number of rotations of the motor 53*a* of the use-side fan 53 is smaller than a predetermined value. Such a determination is performed because it is difficult to diagnose performance degradation under a condition in which the load of the use-side heat exchanger 52 is small.

If the determination in step S21 is Yes, the process proceeds to step S25, where the determining unit 216 diagnoses performance degradation of the air conditioning apparatus 100 due to soiling of the use-side heat exchanger 52 on the basis of the second heat exchange temperature difference and the use-side heat exchange amount Q2 serving as indices indicating an operation state of the air conditioning apparatus 100 as described above (step S25). After that, the process proceeds to step S30.

On the other hand, if the determination in step S21 is No, the process proceeds to step S22, where the air-conditioning control unit 214 causes the air conditioning apparatus 100 to execute at least one of an operation of increasing the number of rotations of the motor 21*a* of the compressor 21 and an operation of decreasing the number of rotations of the motor 53*a* of the use-side fan 53, to control the operation condition of the air conditioning apparatus 100 which is operating to an appropriate operation condition.

After that, the process proceeds to step S23, where a determination is made similarly to step S21. If the determination in step S23 is Yes, the process proceeds to step S25. On the other hand, if the determination in step S23 is No, it is determined that performance diagnosis of the air conditioning apparatus 100 due to soiling of the use-side heat exchanger 52 or the like is not executable. After that, the performance diagnosis process may be suspended or the process may proceed to step S30.

After the process proceeds to step S30, the air-conditioning control unit 214 determines whether the operation condition of the air conditioning apparatus 100 which is operating is an operation condition in which the determining unit 216 is capable of determining performance degradation of the air conditioning apparatus 100 due to a decrease in the amount of refrigerant (step S31, see FIG. 4C). Specifically, the air-conditioning control unit 214 determines whether the value of the degree of subcooling SC is within an appropriate range between a predetermined maximum reference value and a predetermined minimum reference value. Although not limited, the maximum reference value is 10° C., for example, and the minimum reference value is 0° C., for example.

If the determination in step S31 is Yes, the process proceeds to step S39, where the determining unit 216 diagnoses performance degradation of the air conditioning apparatus 100 due to a decrease in the amount of refrigerant by using a refrigerant circulation amount, an outside air temperature, a condensation temperature, an indoor temperature, an indoor humidity, an evaporation temperature, and a degree of subcooling as input values as described above. After that, the process proceeds to step S40 (see FIG. 4B).

On the other hand, if the determination in step S31 is No, the process proceeds to step S32, where the air-conditioning control unit 214 determines whether the degree of subcooling SC is too low (the value of the degree of subcooling SC is smaller than the minimum reference value) or too high (the value of the degree of subcooling SC is greater than the maximum reference value). If the degree of subcooling SC is too low, the process proceeds to step S33. If the degree of subcooling SC is too high, the process proceeds to step S36.

A reason that the degree of subcooling SC is controlled to be within the predetermined appropriate range is that the accuracy of performance diagnosis of the air conditioning apparatus 100 based on a decrease in the amount of refrigerant decreases if the degree of subcooling SC is too high or too low.

Figure 5:
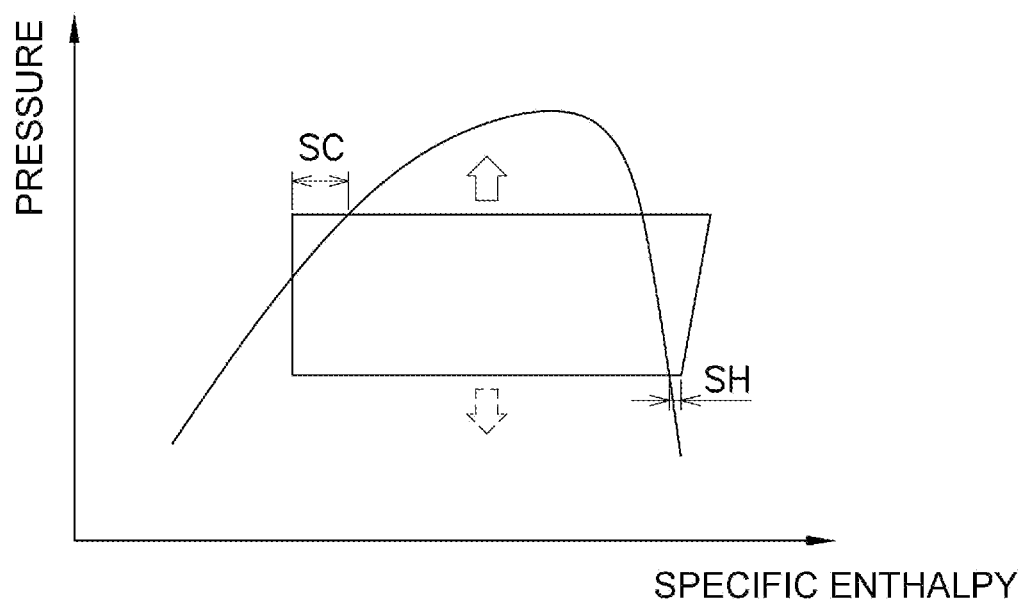
FIG. 5 is a Mollier diagram illustrating a conceptual refrigeration cycle.

If the degree of subcooling SC is too low, control is performed to move a Mollier diagram upward in a refrigeration cycle so as to increase the degree of subcooling SC (see the solid-line arrow in FIG. 5). Specifically, if the degree of subcooling SC in the refrigeration cycle of the air conditioning apparatus 100 which is operating has a value smaller than the minimum reference value, the air-conditioning control unit 214 causes the control unit 60 of the air conditioning apparatus 100 to execute at least one of an operation of increasing the number of rotations of the motor 21*a* of the compressor 21, an operation of decreasing the number of rotations of the motor 28*a* of the heat-source-side fan 28, and an operation of decreasing the opening degree of the electronic expansion valve which is an example of the expansion mechanism 25, to control the operation condition of the air conditioning apparatus 100 to an appropriate operation condition (step S33).

After that, the process proceeds to step S34, where a determination is made similarly to step S31. If the determination in step S34 is Yes, the process proceeds to step S39. On the other hand, if the determination in step S34 is No, it is determined that performance diagnosis of the air conditioning apparatus 100 due to a decrease in the amount of refrigerant is not executable (step S35). After that, the performance diagnosis process may be suspended or the process may proceed to step S40.

On the other hand, if the degree of subcooling SC is too high, control is performed to move the Mollier diagram downward in a refrigeration cycle so as to decrease the degree of subcooling SC (see the broken-line arrow in FIG. 5). Specifically, if the degree of subcooling SC in the refrigeration cycle of the air conditioning apparatus 100 which is operating has a value greater than the maximum reference value, the air-conditioning control unit 214 causes the control unit 60 of the air conditioning apparatus 100 to execute at least one of an operation of decreasing the number of rotations of the motor 21*a* of the compressor 21, an operation of increasing the number of rotations of the motor 28*a* of the heat-source-side fan 28, and an operation of increasing the opening degree of the electronic expansion valve which is an example of the expansion mechanism 25, to control the operation condition of the air conditioning apparatus 100 to an appropriate operation condition (step S36).

After that, the process proceeds to step S37, where a determination is made similarly to step S31. If the determination in step S37 is Yes, the process proceeds to step S39. On the other hand, if the determination in step S37 is No, it is determined that performance diagnosis of the air conditioning apparatus 100 due to a decrease in the amount of refrigerant is not executable (step S38). After that, the performance diagnosis process may be suspended or the process may proceed to step S40.

In step S40, when the determining unit 216 determines that the air conditioning apparatus 100 has performance degradation resulting from at least one performance degradation factor, the diagnosis apparatus 210 reports that the air conditioning apparatus 100 has performance degradation and reports the performance degradation factor, to a manager, a maintenance worker, or the like of the air conditioning apparatus 100. If the performance of the air conditioning apparatus 100 has been degraded by a plurality of performance degradation factors, the diagnosis apparatus 210 may report the plurality of performance degradation factors to the manager, the maintenance worker, or the like of the air conditioning apparatus 100. For example, the diagnosis apparatus 210 causes the display 222 of the diagnosis apparatus 210 to display content reporting the presence of performance degradation and the performance degradation factors. The diagnosis apparatus 210 may report the presence of performance degradation and the performance degradation factors to a mobile terminal or the like carried by the manager or the like of the air conditioning apparatus 100. If the determining unit 216 determines that there is no performance degradation of the air conditioning apparatus 100, the diagnosis apparatus 210 may display the fact that there is no performance degradation of the air conditioning apparatus 100 on the display 222 or the like.

In the description given above, if it is determined in step S14, S24, S35, or S38 that diagnosis is not executable, performance degradation diagnosis of the air conditioning apparatus 100 is not performed for a performance degradation factor of a determination target. However, the air-conditioning control unit 214 may change various operation conditions of the air conditioning apparatus 100 until performance degradation of the air conditioning apparatus 100 becomes possible with respect to the performance degradation factor of a determination target instead of performing such a process.

(5) Features
(5-1)

The performance degradation diagnosis system 200 according to the above-described embodiment is the performance degradation diagnosis system 200 for the air conditioning apparatus 100 that includes the refrigerant circuit 10 including the compressor 21, the heat-source-side heat exchanger 23, and the use-side heat exchanger 52. The air conditioning apparatus 100 is an example of a refrigeration cycle apparatus. The performance degradation diagnosis system 200 includes the determining unit 216 and the air-conditioning control unit 214. The determining unit 216 determines, based on an index indicating an operation state of the air conditioning apparatus 100, performance degradation of the air conditioning apparatus 100 with respect to each of a plurality of performance degradation factors of the air conditioning apparatus 100. In a case where the determining unit 216 determines performance degradation of the air conditioning apparatus 100 with respect to each of the performance degradation factors, the air-conditioning control unit 214 controls an operation condition of the air conditioning apparatus 100 to an appropriate operation condition suitable for determining performance degradation of the air conditioning apparatus 100 with respect to a performance degradation factor of a determination target.

For example, when the determining unit 216 determines performance degradation of the air conditioning apparatus 100 with respect to each of the performance degradation factors, the air-conditioning control unit 214 grasps an operation condition of the air conditioning apparatus 100 which is operating, and in a case where the operation condition of the air conditioning apparatus 100 is not suitable for determining performance degradation of the air conditioning apparatus 100 with respect to a performance degradation factor of a determination target, controls the operation condition of the air conditioning apparatus 100 so that the operation condition of the air conditioning apparatus 100 becomes an appropriate operation condition.

In the performance degradation diagnosis system 200 according to the above-described embodiment, at the time of determination of performance degradation of the air conditioning apparatus 100 with respect to each or a plurality of performance degradation factors, an operation condition of the air conditioning apparatus 100 is controlled to an appropriate operation condition suitable for each performance degradation factor of a determination target. The appropriate operation condition suitable for each performance degradation factor of a determination target means an operation condition suitable for determining performance degradation of the air conditioning apparatus 100 resulting from the performance degradation factor. With this configuration, a cause of performance degradation can be accurately identified from among various performance degradation factors.

(5-2)

In the performance degradation diagnosis system 200 according to the above-described embodiment, for example, in a case where the operation condition of the air conditioning apparatus 100 which is operating is an operation condition in which the determining unit 216 is incapable of determining performance degradation of the air conditioning apparatus 100 with respect to the performance degradation factor of the determination target, the air-conditioning control unit 214 controls the operation condition of the air conditioning apparatus 100 to the appropriate operation condition.

In the performance degradation diagnosis system 200 according to the above-described embodiment, the operation condition of the air conditioning apparatus 100 is changed in a case where performance degradation of the air conditioning apparatus 100 is not determinable. In other words, when the air conditioning apparatus 100 is executing a cooling operation, if the operation condition thereof is an operation condition in which performance degradation of the air conditioning apparatus 100 is determinable, the operation condition is not changed but is maintained. Thus, it is possible to reduce an influence of performance degradation diagnosis on the operation of the air conditioning apparatus 100.

(5-3)

In the performance degradation diagnosis system 200 according to the above-described embodiment, the air conditioning apparatus 100 includes the heat-source-side fan 28 and an expansion valve serving as the expansion mechanism 25. The heat-source-side fan 28 supplies air to the heat-source-side heat exchanger 23. The expansion mechanism 25 is disposed between the heat-source-side heat exchanger 23 and the use-side heat exchanger 52 in the refrigerant circuit 10 and decompresses refrigerant flowing in the refrigerant circuit 10. The performance degradation factors of the determination target of the performance degradation diagnosis system 200 include a decrease in the amount of refrigerant. Preferably, in a case where the determining unit 216 determines performance degradation of the air conditioning apparatus 100 due to the decrease in the amount of refrigerant, and the degree of subcooling SC in a refrigeration cycle of the air conditioning apparatus 100 which is operating has a value smaller than a first predetermined value, the air-conditioning control unit 214 causes the air conditioning apparatus 100 to execute at least one of an operation of increasing the number of rotations of the compressor 21, an operation of decreasing the number of rotations of the heat-source-side fan 28, and an operation of decreasing the opening degree of the expansion mechanism 25, to control the operation condition of the air conditioning apparatus 100 to the appropriate operation condition. Although not limited, the first predetermined value is, for example, 0° C.

Here, at the time of determining performance degradation of the air conditioning apparatus 100 due to a decrease in the amount of refrigerant, the operation condition of the air conditioning apparatus 100 is changed to an operation condition suitable for the determination. In other words, in the performance degradation diagnosis system 200 according to the above-described embodiment, at the time of determining performance degradation of the air conditioning apparatus 100 due to the refrigerant leakage, the operation condition of the air conditioning apparatus 100 is changed to an operation condition suitable for determining refrigerant leakage. Thus, in the performance degradation diagnosis system 200 according to the above-described embodiment, performance degradation of the air conditioning apparatus 100 due to the refrigerant leakage can be accurately determined.

Preferably, in the performance degradation diagnosis system 200 according to the above-described embodiment, in a case where the determining unit 216 determines performance degradation of the air conditioning apparatus 100 due to the decrease in the amount of refrigerant, and the degree of subcooling SC in a refrigeration cycle of the air conditioning apparatus 100 which is operating has a value greater than a second predetermined value, the air-conditioning control unit 214 causes the air conditioning apparatus 100 to execute at least one of an operation of decreasing the number of rotations of the compressor 21, an operation of increasing the number of rotations of the heat-source-side fan 28, and an operation of increasing an increase of the expansion mechanism 25, to control the operation condition of the air conditioning apparatus 100 to the appropriate operation condition. Although not limited, the second predetermined value is, for example, 10° C.

Here, performance degradation of the air conditioning apparatus 100 due to refrigerant leakage can be accurately determined.

(5-4)

In the performance degradation diagnosis system 200 according to the above-described embodiment, the performance degradation factors of the determination target of the performance degradation diagnosis system 200 include soiling of the heat-source-side heat exchanger 23. Preferably, in a case where the determining unit 216 determines performance degradation of the air conditioning apparatus 100 due to the soiling of the heat-source-side heat exchanger 23, the air-conditioning control unit 214 causes the air conditioning apparatus 100 to execute at least one of an operation of increasing the number of rotations of the compressor 21 and an operation of decreasing the number of rotations of the heat-source-side fan 28, to control the operation condition of the air conditioning apparatus 100 which is operating to the appropriate operation condition.

Here, performance degradation of the air conditioning apparatus 100 due to soiling of the heat-source-side heat exchanger 23 can be accurately determined.

(5-5)

In the performance degradation diagnosis system 200 according to the above-described embodiment, the air conditioning apparatus 100 includes the use-side fan 53 and the filter 58. The use-side fan 53 supplies air to the use-side heat exchanger 52. The filter 58 removes a foreign substance from air to be supplied to the use-side heat exchanger 52. The performance degradation factors of the determination target of the performance degradation diagnosis system 200 include at least one of soiling of the use-side heat exchanger 52 and soiling of the filter 58. Preferably, in a case where the determining unit 216 determines performance degradation of the air conditioning apparatus 100 due to at least one of the soiling of the use-side heat exchanger 52 and soiling of the filter 58, the air-conditioning control unit 214 causes the air conditioning apparatus 100 to execute at least one of an operation of increasing the number of rotations of the compressor and an operation of decreasing the number of rotations of the use-side fan 53, to control the operation condition of the air conditioning apparatus 100 which is operating to the appropriate operation condition.

Here, performance degradation of the air conditioning apparatus 100 due to soiling of the use-side heat exchanger 52 or the filter 58 can be accurately determined.

(5-6)

Preferably, in the performance degradation diagnosis system 200 according to the above-described embodiment, in a case where the degree of subcooling SC in a refrigeration cycle of the air conditioning apparatus 100 which is operating has a value smaller than or equal to a third predetermined value, the air-conditioning control unit 214 causes the air conditioning apparatus 100 to execute at least one of an operation of decreasing the number of rotations of the compressor, an operation of increasing the number of rotations of the heat-source-side fan 28, and an operation of decreasing the opening degree of an expansion valve which is an example of the expansion mechanism 25, to control the operation condition of the air conditioning apparatus 100 to the appropriate operation condition. The third predetermined value is, for example, 0° C.

Here, the operation condition of the air conditioning apparatus 100 is controlled to a condition suitable for determining performance degradation of the air conditioning apparatus 100, and thus the presence or absence of performance degradation can be accurately detected.

(5-7)

Preferably, in the performance degradation diagnosis system 200 according to the above-described embodiment, in a case where the degree of superheating SH in a refrigeration cycle of the air conditioning apparatus 100 which is operating has a value smaller than a fourth predetermined value, the air-conditioning control unit 214 causes the air conditioning apparatus 100 to execute at least one of an operation of decreasing the number of rotations of the compressor, an operation of increasing the number of rotations of the heat-source-side fan 28, and an operation of decreasing the opening degree of an expansion valve which is an example of the expansion mechanism 25, to control the operation condition of the air conditioning apparatus 100 to the appropriate operation condition. The fourth predetermined value is, for example, 0° C.

Here, the operation condition of the air conditioning apparatus 100 is controlled to a condition suitable for determining performance degradation of the air conditioning apparatus 100, and thus the presence or absence of performance degradation can be accurately detected.

(5-8)

Preferably, the performance degradation diagnosis system 200 according to the above-described embodiment includes the overall determining unit 218 that determines overall performance degradation of the air conditioning apparatus 100. In a case where the overall determining unit 218 determines that the air conditioning apparatus 100 has overall performance degradation, the determining unit 216 determines performance degradation of the air conditioning apparatus 100 with respect to each of a plurality of performance degradation factors. Preferably, the overall determining unit 218 determines overall performance degradation based on an index indicating an operation state of the air conditioning apparatus 100 when the air conditioning apparatus 100 is performing normal operation.

Here, in a case where there is overall performance degradation, performance degradation of the air conditioning apparatus 100 is determined with respect to each of performance degradation factors. Thus, it is possible to minimize the occurrence of a problem in which normal operation is interrupted by the operation of the air conditioning apparatus 100 in which the operation condition is changed for diagnosing the performance degradation.

The embodiment of the present disclosure has been described above. It is to be understood that the embodiment and the details can be variously changed without deviating from the gist and scope of the present disclosure described in the claims.

What is claimed is:

1. A performance degradation diagnosis system for a refrigeration cycle apparatus that includes a refrigerant circuit including a compressor, a heat-source-side heat exchanger, and a use-side heat exchanger, the performance degradation diagnosis system comprising:
   a computer including a first determining unit configured to determine, based on an index indicating an operation state of the refrigeration cycle apparatus, performance degradation of the refrigeration cycle apparatus with respect to each of a plurality of performance degradation factors of the refrigeration cycle apparatus; and
   a control unit configured,
      before the first determining unit determines performance degradation of the refrigeration cycle apparatus with respect to each of the performance degradation factors, to obtain an operation condition of the refrigeration cycle apparatus which is operating, and
      in a case in which the operation condition of the refrigeration cycle apparatus is not suitable to determine performance degradation of the refrigeration cycle apparatus with respect to a performance degradation factor of a determination target, to control the operation condition of the refrigeration cycle apparatus so that the operation condition of the refrigeration cycle apparatus becomes suitable to determine performance degradation of the refrigeration cycle apparatus.

2. The performance degradation diagnosis system for a refrigeration cycle apparatus according to claim 1, wherein
   the refrigeration cycle apparatus further includes
      a heat-source-side fan configured to supply air to the heat-source-side heat exchanger and
      an expansion valve disposed between the heat-source-side heat exchanger and the use-side heat exchanger in the refrigerant circuit to decompress refrigerant flowing in the refrigerant circuit,
   the performance degradation factors include a decrease in an amount of refrigerant, and
   in a case in which the first determining unit determines performance degradation of the refrigeration cycle apparatus due to the decrease in the amount of refrigerant, and a degree of subcooling in a refrigeration cycle of the refrigeration cycle apparatus which is operating has a value smaller than a first predetermined value, the control unit is configured to cause the refrigeration cycle apparatus to execute at least one of
      an operation of increasing the number of rotations of the compressor,
      an operation of decreasing the number of rotations of the heat-source-side fan, and
      an operation of decreasing an opening degree of the expansion valve,
   to control the operation condition of the refrigeration cycle apparatus to the operation condition suitable to determine performance degradation of the refrigeration cycle apparatus.

3. The performance degradation diagnosis system for a refrigeration cycle apparatus according to claim L wherein
   the refrigeration cycle apparatus further includes
      a heat-source-side fan configured to supply air to the heat-source-side heat exchanger and
      an expansion valve disposed between the heat-source-side heat exchanger and the use-side heat exchanger in the refrigerant circuit to decompress refrigerant flowing in the refrigerant circuit,
   the performance degradation factors include a decrease in an amount of refrigerant, and
   in a case in which the first determining unit determines perforenone degradation of the refrigeration cycle apparatus due to the decrease in the amount of refrigerant, and a degree of subcooling in a refrigeration cycle of the refrigeration cycle apparatus which is operating has a value greater than a second predetermined value, the control unit is configured to cause the refrigeration cycle apparatus to execute at least one of
      an operation of decreasing the number of rotations of the compressor,
      an operation of increasing the number of rotations of the heat-source-side fan, and
      an operation of increasing an increase of the expansion valve,
   to control the operation condition of the refrigeration cycle apparatus to the operation condition suitable to determine performance degradation of the refrigeration cycle apparatus.

4. The performance degradation diagnosis system for a refrigeration cycle apparatus according to claim L wherein
   the refrigeration cycle apparatus further includes a heat-source-side fan configured to supply air to the heat-source-side heat exchanger,
   the performance degradation factors include soiling of the heat-source-side heat exchanger, and
   in a case in which the first determining unit determines performance degradation of the refrigeration cycle apparatus due to the soiling of the heat-source-side heat exchanger, the control unit is configured to cause the refrigeration cycle apparatus to execute at least one of
      an operation of increasing the number of rotations of the compressor, and
      an operation of decreasing the number of rotations of the heat-source-side fan, to control the operation condition of the refrigeration cycle apparatus, which is operating, to the operation condition suitable to determine performance degradation of the refrigeration cycle apparatus.

5. The performance degradation diagnosis system for a refrigeration cycle apparatus according to claim 1, wherein the refrigeration cycle apparatus further includes
a use-side fan configured to supply air to the use-side heat exchanger and
a filter configured to remove a foreign substance from the air to be supplied to the use-side heat exchanger,
the performance degradation factors include at least one of soiling of the use-side heat exchanger and soiling of the filter, and
in a case in which the first determining unit determines performance degradation of the refrigeration cycle apparatus due to at least one of the soiling of the use-side heat exchanger and the soiling of the filter, the control unit is configured to cause the refrigeration cycle apparatus to execute at least one of
an operation of increasing the number of rotations of the compressor, and
an operation of decreasing the number of rotations of the use-side fan,
to control the operation condition of the refrigeration cycle apparatus, which is operating, to the operation condition suitable to determine performance degradation of the refrigeration cycle apparatus.

6. The performance degradation diagnosis system for a refrigeration cycle apparatus according to claim 1, wherein the refrigeration cycle apparatus further includes
a heat-source-side fan configured to supply air to the heat-source-side heat exchanger and
an expansion valve disposed between the heat-source-side heat exchanger and the use-side heat exchanger in the refrigerant circuit to decompress refrigerant flowing in the refrigerant circuit, and
in a case in which a degree of subcooling in a refrigeration cycle of the refrigeration cycle apparatus which is operating has a value smaller than or equal to a third predetermined value, the control unit is configured to cause the refrigeration cycle apparatus to execute at least one of
an operation of increasing the number of rotations of the compressor,
an operation of increasing the number of rotations of the heat-source-side fan, and
an operation of decreasing an opening degree of the expansion valve,
to control the operation condition of the refrigeration cycle apparatus to the operation condition suitable to determine performance degradation of the refrigeration cycle apparatus.

7. The performance degradation diagnosis system for a refrigeration cycle apparatus according to claim 1, wherein the refrigeration cycle apparatus further includes
a heat-source-side fan configured to supply air to the heat-source-side heat exchanger and
an expansion valve disposed between the heat-source-side heat exchanger anti the use-side heat exchanger in the refrigerant circuit to decompress refrigerant flowing in the refrigerant circuit, and
in a case in which a degree of superheating in a refrigeration cycle of the refrigeration cycle apparatus which is operating has a value smaller than or equal to a fourth predetermined value, the control unit is configured to cause the refrigeration cycle apparatus to execute at least one of
an operation of increasing the number of rotations of the compressor,
an operation of increasing the number of rotations of the heat-source-side fan, and
an operation of decreasing an opening degree of the expansion valve,
to control the operation condition of the refrigeration cycle apparatus to the operation condition suitable to determine performance degradation of the refrigeration cycle apparatus.

8. The performance degradation diagnosis system for a refrigeration cycle apparatus according to claim 1, wherein the computer further includes an overall determining unit configured to determine overall performance degradation of the refrigeration cycle apparatus,
in a case in which the overall determining unit determines that the refrigeration cycle apparatus has the overall performance degradation, the first determining unit being configured to determine performance degradation of the refrigeration cycle apparatus with respect to each of the plurality of performance degradation factors.

9. The performance degradation diagnosis system for a refrigeration cycle apparatus according to claim 2, wherein the refrigeration cycle apparatus further includes
a use-side fan configured to supply air to the use-side heat exchanger and
a filter configured to remove a foreign substance from the air to be supplied to the use-side heat exchanger,
the performance degradation factors include at least one of soiling of the use-side heat exchanger and soiling of the filter, and
in a case in which the first determining unit determines performance degradation of the refrigeration cycle apparatus due to at least one of the soiling of the use-side heat exchanger and the soiling of the filter, the control unit is configured to cause the refrigeration cycle apparatus to execute at least one of
an operation of increasing the number of rotations of the compressor, and
an operation of decreasing the number of rotations of the use-side fan,
to control the operation condition of the refrigeration cycle apparatus, which is operating, to the operation condition suitable to determine performance degradation of the refrigeration cycle apparatus.

10. The performance degradation diagnosis system for a refrigeration cycle apparatus according to claim 2, wherein the computer further includes an overall determining unit configured to determine overall performance degradation of the refrigeration cycle apparatus,
in a case in which the overall determining unit determines that the refrigeration cycle apparatus has the overall performance degradation, the first determining unit being configured to determine performance degradation of the refrigeration cycle apparatus with respect to each of the plurality of performance degradation factors.

11. The performance degradation diagnosis system for a refrigeration cycle apparatus according to claim 3, wherein the refrigeration cycle apparatus further includes
a use-side fan configured to supply air to the use-side heat exchanger and a filter configured to remove a foreign substance from the air to be supplied to the use-side heat exchanger, the performance degradation factors include at least one of soiling of the use-side heat exchanger and soiling of the filter, and in a case in which the first determining unit determines performance degradation of the refrigeration cycle apparatus due to at least one of the soiling of the use-side heat exchanger and the soiling of the filter, the control unit is configured to cause the refrigeration cycle apparatus to execute at least one of an operation of increasing the number of rotations of the compressor, and an operation of decreasing the number of rotations of the use-side fan, to control the operation condition of the refrigeration cycle apparatus, which is operating, to the operation condition suitable to determine performance degradation of the refrigeration cycle apparatus.

12. The performance degradation diagnosis system for a refrigeration cycle apparatus according to claim 3, wherein the computer further includes an overall determining unit configured to determine overall performance degradation of the refrigeration cycle apparatus, in a case in which the overall determining unit determines that the refrigeration cycle apparatus has the overall performance degradation, the first determining unit being configured to determine performance degradation of the refrigeration cycle apparatus with respect to each of the plurality of performance degradation factors.

13. The performance degradation diagnosis system for a refrigeration cycle apparatus according to claim 4, wherein the refrigeration cycle apparatus further includes a use-side fan configured to supply air to the use-side heat exchanger and a filter configured to remove a foreign substance from the air to be supplied to the use-side heat exchanger, the performance degradation factors include at least one of soiling of the use-side heat exchanger and soiling of the filter, and in a case in which the first determining unit determines performance degradation of the refrigeration cycle apparatus due to at least one of the soiling of the use-side heat exchanger and the soiling of the filter, the control unit is configured to cause the refrigeration cycle apparatus to execute at least one of an operation of increasing the number of rotations of the compressor, and an operation of decreasing the number of rotations of the use-side fan, to control the operation condition of the refrigeration cycle apparatus, which is operating, to the operation condition suitable to determine performance degradation of the refrigeration cycle apparatus.

14. The performance degradation diagnosis system for a refrigeration cycle apparatus according to claim 4, wherein the computer further includes, an overall determining unit configured to determine overall performance degradation of the refrigeration cycle apparatus, in a case in which the overall determining unit determines that the refrigeration cycle apparatus has the overall performance degradation, the first determining unit being configured to determine performance degradation of the refrigeration cycle apparatus with respect to each of the plurality of performance degradation factors.

15. The performance degradation diagnosis system for a refrigeration cycle apparatus according to claim 5, wherein the computer further includes an overall determining unit configured to determine overall performance degradation of the refrigeration cycle apparatus, in a case in which the overall determining unit determines that the refrigeration cycle apparatus has the overall performance degradation, the first determining unit being configured to determine performance degradation of the refrigeration cycle apparatus with respect to each of the plurality of performance degradation factors.

16. The performance degradation diagnosis system for a refrigeration cycle apparatus according to claim 6, wherein the computer further includes an overall determining unit configured to determine overall performance degradation of the refrigeration cycle apparatus, in a case in which the overall determining unit determines that the refrigeration cycle apparatus has the overall performance degradation, the first determining unit being configured to determine performance degradation of the refrigeration cycle apparatus with respect to each of the plurality of performance degradation factors.

17. The performance degradation diagnosis system for a refrigeration cycle apparatus according to claim 7, wherein the computer further includes an overall determining unit configured to determine overall performance degradation of the refrigeration cycle apparatus, in a case in which the overall determining unit determines that the refrigeration cycle apparatus has the overall performance degradation, the first determining unit being configured to determine performance degradation of the refrigeration cycle apparatus with respect to each of the plurality of performance degradation factors.

\* \* \* \* \*